(12) United States Patent
Liu et al.

(10) Patent No.: US 11,599,199 B2
(45) Date of Patent: Mar. 7, 2023

(54) GESTURE RECOGNITION APPARATUS, GESTURE RECOGNITION METHOD, COMPUTER DEVICE AND STORAGE MEDIUM

(71) Applicant: BOE Technology Group Co., Ltd., Beijing (CN)

(72) Inventors: Cheng Liu, Beijing (CN); Sijia Guo, Beijing (CN); Guanchu Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 345 days.

(21) Appl. No.: 16/868,588

(22) Filed: May 7, 2020

(65) Prior Publication Data

US 2021/0165493 A1 Jun. 3, 2021

(30) Foreign Application Priority Data

Nov. 28, 2019 (CN) .......................... 201911190008.8

(51) Int. Cl.
*G06F 3/01* (2006.01)
*G05B 15/02* (2006.01)
*G01B 11/14* (2006.01)
*G01S 7/4914* (2020.01)

(52) U.S. Cl.
CPC .............. *G06F 3/017* (2013.01); *G01B 11/14* (2013.01); *G01S 7/4914* (2013.01); *G05B 15/02* (2013.01); *G06F 3/011* (2013.01)

(58) Field of Classification Search
CPC ........ G06F 3/017; G06F 3/011; G06F 3/0304; G01B 11/14; G01B 11/026; G01S 7/4914; G01S 17/003; G01S 17/87; G05B 15/02
See application file for complete search history.

(56) References Cited

U.S. PATENT DOCUMENTS

| | | | | |
|---|---|---|---|---|
| 8,457,353 | B2* | 6/2013 | Reville | ................... G06F 3/011 382/103 |
| 8,659,658 | B2* | 2/2014 | Vassigh | ................... G06F 3/017 348/143 |
| 8,803,952 | B2* | 8/2014 | Katz | ...................... G01S 17/894 348/47 |
| 8,988,662 | B1* | 3/2015 | Haskin | ...................... G01C 3/08 356/9 |
| 9,696,867 | B2* | 7/2017 | Holz | ...................... G06V 40/28 |

(Continued)

FOREIGN PATENT DOCUMENTS

| CN | 105204650 A | * 12/2015 |
|---|---|---|
| CN | 107444338 A | 12/2017 |

(Continued)

*Primary Examiner* — Yongjia Pan
(74) *Attorney, Agent, or Firm* — Lippes Mathias LLP

(57) ABSTRACT

A gesture recognition apparatus, a gesture recognition method, a computer device and a storage medium are disclosed. The gesture recognition apparatus includes a controller, a first distance sensor and a second distance sensor, wherein a first measurement area of the first distance sensor partially overlaps a second measurement area of the second distance sensor; and the controller is configured to recognize a gesture to be measured according to a first trajectory and a second trajectory as well as a position relationship between the first distance sensor and the second distance sensor.

16 Claims, 14 Drawing Sheets

(56) References Cited

U.S. PATENT DOCUMENTS

| | | | |
|---|---|---|---|
| 9,996,160 B2* | 6/2018 | Tachibana | G06F 3/0485 |
| 10,175,751 B2* | 1/2019 | Edwards | G06F 3/011 |
| 2011/0180709 A1 | 7/2011 | Craddock et al. | |
| 2012/0194479 A1* | 8/2012 | Stark | G06F 3/0428 |
| | | | 345/175 |
| 2012/0268373 A1* | 10/2012 | Grzesiak | G06F 3/0304 |
| | | | 345/158 |
| 2012/0280900 A1* | 11/2012 | Wang | G06F 3/0488 |
| | | | 345/156 |
| 2013/0229508 A1* | 9/2013 | Li | G06F 1/3287 |
| | | | 348/77 |
| 2014/0118246 A1* | 5/2014 | Park | G06F 3/0304 |
| | | | 345/156 |
| 2014/0157209 A1* | 6/2014 | Dalal | G06F 3/012 |
| | | | 715/863 |
| 2015/0160737 A1* | 6/2015 | Jeong | G06V 40/28 |
| | | | 345/173 |
| 2016/0266647 A1 | 9/2016 | Leheup | |
| 2017/0269699 A1* | 9/2017 | Withanage Don | G06F 1/3262 |
| 2017/0335606 A1 | 11/2017 | Schatz et al. | |
| 2020/0401291 A1* | 12/2020 | Tanabe | G06F 3/04883 |

FOREIGN PATENT DOCUMENTS

| | | | | |
|---|---|---|---|---|
| TW | 201203008 A | | 1/2012 | |
| WO | WO-2013054664 A1 | * | 4/2013 | G06F 3/0304 |
| WO | WO-2017088631 A | * | 6/2017 | G06F 3/01 |
| WO | WO2018148951 A1 | | 8/2018 | |

* cited by examiner

GESTURE RECOGNITION APPARATUS, GESTURE RECOGNITION METHOD, COMPUTER DEVICE AND STORAGE MEDIUM

This application claims priority to Chinese Patent Application No. 201911190008.8, filed on Nov. 28, 2019 and entitled "GESTURE RECOGNITION APPARATUS, GESTURE RECOGNITION METHOD, COMPUTER DEVICE AND STORAGE MEDIUM", the entire contents of which are incorporated herein by reference.

TECHNICAL FIELD

The present disclosure relates to the field of distance measurement technology, and more particularly to a gesture recognition apparatus, a gesture recognition method, a computer device and a storage medium.

BACKGROUND

As one of distance measurement principles, the optical time-of-flight (TOF) distance measurement principle is mainly implemented by continuously sending an optical pulse to a measured target, receiving the optical pulse returned from the measured target by a sensor, and detecting a flight (round trip) time of the optical pulse to obtain a distance to the measured target.

SUMMARY

The present disclosure provides a gesture recognition apparatus, a gesture recognition method, a computer device and a storage medium.

In the first aspect of embodiments of the present disclosure, a gesture recognition apparatus is provided. The gesture recognition apparatus includes a controller, a first distance sensor and a second distance sensor, wherein a first measurement area of the first distance sensor partially overlaps a second measurement area of the second distance sensor, and the first measurement area is a spatial range measurable in distance by the first distance sensor, and the second measurement area is a spatial range measurable in distance by the second distance sensor;

the controller is connected to the first distance sensor and the second distance sensor, respectively, and the controller is configured to acquire a first trajectory and a second trajectory of a gesture to be measured, and recognize the gesture to be measured according to the first trajectory and the second trajectory as well as a position relationship between the first distance sensor and the second distance sensor; the first trajectory reflects changes over time of a plurality of first distances obtained by the first distance sensor within an occurrence period of the gesture to be measured; and the second trajectory reflects changes over time of a plurality of second distances obtained by the second distance sensor within the occurrence period of the gesture to be measured.

In a possible implementation, the controller is further configured to:

set the first distance exceeding a maximum gesture recognition distance in the first trajectory as the maximum gesture recognition distance and the second distance exceeding the maximum gesture recognition distance in the second trajectory as the maximum gesture recognition distance when acquiring the first trajectory and the second trajectory of the gesture to be measured.

In a possible implementation, the first distance sensor and the second distance sensor are in a same plane; the first measurement area is a spatial area with a main axis of the first distance sensor as a symmetry axis; the second measurement area is a spatial area with a main axis of the second distance sensor as a symmetry axis; the main axes of the first distance sensor and the second distance sensor are both perpendicular to the plane; and the controller is further configured to:

prior to acquiring the first trajectory and the second trajectory of the gesture to be measured, calculate the maximum gesture recognition distance according to a spacing between the first distance sensor and the second distance sensor, a field angle of the first distance sensor, a field angle of the second distance sensor, and a minimum movement distance that the gesture to be measured is capable of passing through an overlapping area between the first measurement area and the second measurement area in a direction from the first distance sensor to the second distance sensor.

In a possible implementation, the first distance sensor and the second distance sensor are in a same plane; the first measurement area is a spatial area with a main axis of the first distance sensor as a symmetry axis; the second measurement area is a spatial area with a main axis of the second distance sensor as a symmetry axis; and the main axes of the first distance sensor and the second distance sensor are both perpendicular to the plane.

In a possible implementation, the controller is further configured to:

judge whether a first distant-near-distant wave trough trajectory exists in the first trajectory and whether a second distant-near-distant wave trough trajectory exists in the second trajectory; and recognize the gesture to be measured according to a sequential order of the first wave trough trajectory and the second wave trough trajectory as well as the position relationship between the first distance sensor and the second distance sensor if the first wave trough trajectory and the second wave trough trajectory exist.

In a possible implementation, a condition for judging that the first wave trough trajectory and the second wave trough trajectory exist includes at least one of the followings:

durations of both the first wave trough trajectory and the second wave trough trajectory are shorter than a wave trough time threshold;

a change amplitude of each of rising and falling edges of the first wave trough trajectory and rising and falling edges of the second wave trough trajectory in a unit time is greater than a distance threshold; and both the first wave trough trajectory and the second wave trough trajectory change from distant to near to be less than the maximum gesture recognition distance, and change from near to distant to be greater than the maximum gesture recognition distance.

In a possible implementation, the controller is further configured to perform at least one of the following steps:

in response to a judgment result that the first wave trough trajectory is earlier than the second wave trough trajectory, determining that a movement direction of the gesture to be measured is from the first distance sensor to the second distance sensor; and in response to a judgment result that the second wave trough trajectory is earlier than the first wave trough trajectory, determining that the movement direction of the gesture to be measured is from the second distance sensor to the first distance sensor.

In a possible implementation, the apparatus further includes at least one third distance sensor, wherein a third measurement area of each of the at least one third distance sensor partially overlaps the first measurement area, partially overlaps the second measurement area, and is a spatial range measurable in distance by the third distance sensor;

the controller is connected to each of the at least one third distance sensor, and the controller is configured to acquire a first trajectory, a second trajectory and each third trajectory of the gesture to be measured, and recognize the gesture to be measured according to the first trajectory, the second trajectory and the third trajectory as well as a position relationship between every two of the first distance sensor, the second distance sensor and the at least one third distance sensor; and the third trajectory reflects changes over time of a plurality of third distances obtained by the third distance sensor within the occurrence period of the gesture to be measured.

In a possible implementation, the first distance sensor, the second distance sensor and each of the at least one third distance sensor are all in a same plane; the first measurement area is a spatial area with a main axis of the first distance sensor as a symmetry axis; the second measurement area is a spatial area with a main axis of the second distance sensor as a symmetry axis; the third measurement area is a spatial area with a main axis of the third distance sensor as a symmetry axis; and the main axes of the first distance sensor, the second distance sensor and the at least one third distance sensor are all perpendicular to the plane.

In a possible implementation, the number of the at least one third distance sensor in the gesture recognition apparatus is one; the first distance sensor, the second distance sensor and the third distance sensor are arranged in any one of the following ways:

a connection line between the third distance sensor and the first distance sensor is perpendicular to a connection line between the first distance sensor and the second distance sensor; and the third distance sensor, the first distance sensor and the second distance sensor are at three vertexes of an equilateral triangle or a similar equilateral triangle, respectively.

In a possible implementation, the first distance sensor, the second distance sensor and the at least one third distance sensor are coordinated with one another in any one of the following ways:

the first distance sensor, the second distance sensor and the at least one third distance sensor distance share one light source;

working frequency bands of the first distance sensor, the second distance sensor and each of the at least one third distance sensor distance are different; and the controller controls the first distance sensor, the second distance sensor and the at least one third distance sensor distance to measure distances in turn within a measurement cycle.

In a possible implementation, the third distance sensor, the first distance sensor and the second distance sensor are at three vertexes of a triangle, respectively, and the controller is further configured to execute at least one of the following steps:

in response to a judgment result that the duration of the first wave trough trajectory is earliest and the duration of the second wave trough trajectory is later than the duration of the third wave trough trajectory, determining that a direction of the gesture to be measured is from the first distance sensor to the second distance sensor;

in response to a judgment result that the duration of the second wave trough trajectory is earliest and the duration of the first wave trough trajectory is later than the duration of the third wave trough trajectory, determining that the direction of the gesture to be measured is from the second distance sensor to the first distance sensor;

in response to a judgment result that the durations of both the first wave trough trajectory and the second wave trough trajectory are substantially simultaneous and the duration of the third wave trough trajectory is later than the durations of both the first wave trough trajectory and the second wave trough trajectory, determining that the direction of the gesture to be measured is from the sides of both the first distance sensor and the second distance sensor to the third distance sensor; and in response to a judgment result that the duration of the third wave trough trajectory is earliest and the durations of both the first wave trough trajectory and the second wave trough trajectory are later than the duration of the third wave trough trajectory, determining that the direction of the gesture to be measured is from the third distance sensor to the sides of both the first distance sensor and the second distance sensor.

In a possible implementation, a connection line between the third distance sensor and the first distance sensor is perpendicular to a connection line between the first distance sensor and the second distance sensor, and the controller is further configured to execute at least one of the following steps:

in response to a judgment result that the durations of both the first wave trough trajectory and the second wave trough trajectory are substantially simultaneous and the duration of the third wave trough trajectory is later than the durations of both the first wave trough trajectory and the second wave trough trajectory, determining that the direction of the gesture to be measured is from the first distance sensor to the third distance sensor;

in response to a judgment result that the duration of the third wave trough trajectory is earliest and the durations of both the first wave trough trajectory and the second wave trough trajectory are substantially simultaneous after the duration of the third wave trough trajectory, determining that the direction of the gesture to be measured is from the third distance sensor to the first distance sensor;

in response to a judgment result that the durations of both the first wave trough trajectory and the third wave trough trajectory are substantially simultaneous and the duration of the second wave trough trajectory is later than the durations of both the first wave trough trajectory and the third wave trough trajectory, determining that the direction of the gesture to be measured is from the first distance sensor to the second distance sensor; and in response to a judgment result that the duration of the second wave trough trajectory is earliest and the durations of both the first wave trough trajectory and the third wave trough trajectory are substantially simultaneous after the duration of the second wave trough trajectory, determining that the direction of the gesture to be measured is from the second distance sensor to the first distance sensor.

In the second aspect of embodiments of the present disclosure, a gesture recognition method using the gesture recognition apparatus according to the first aspect is disclosed. The gesture recognition method includes:

receiving, by a controller, a plurality of first distances obtained by a first distance sensor within an occurrence period of a gesture to be measured to obtain a first trajectory according to a relationship of the plurality of first distances over time;

receiving, by the controller, a plurality of second distances obtained by a second distance sensor within the occurrence period of the gesture to be measured to obtain a second trajectory according to a relationship of the plurality of second distances over time; and recognizing the gesture to be measured by the controller according to the first trajectory and the second trajectory as well as a position relationship between the first distance sensor and the second distance sensor.

In a possible implementation, the gesture recognition method performs at least a part of the steps implemented by the controller according to any implementation in the first aspect.

In the third aspect of embodiments of the present disclosure, a non-transitory computer-readable storage medium is disclosed. A computer program executable by a processor is stored in the non-transitory computer-readable storage medium, and the method according to any implementation in the third aspect is implemented when the program is executed by the processor.

In the fourth aspect of embodiments of the present disclosure, a computer device is disclosed. The computer device includes a memory, a processor, and a computer program stored on the memory and runnable in a processor, wherein a gesture recognition method according to any implementation in the third aspect is implemented when the processor executes the program.

DETAILED DESCRIPTION

Figure 1:
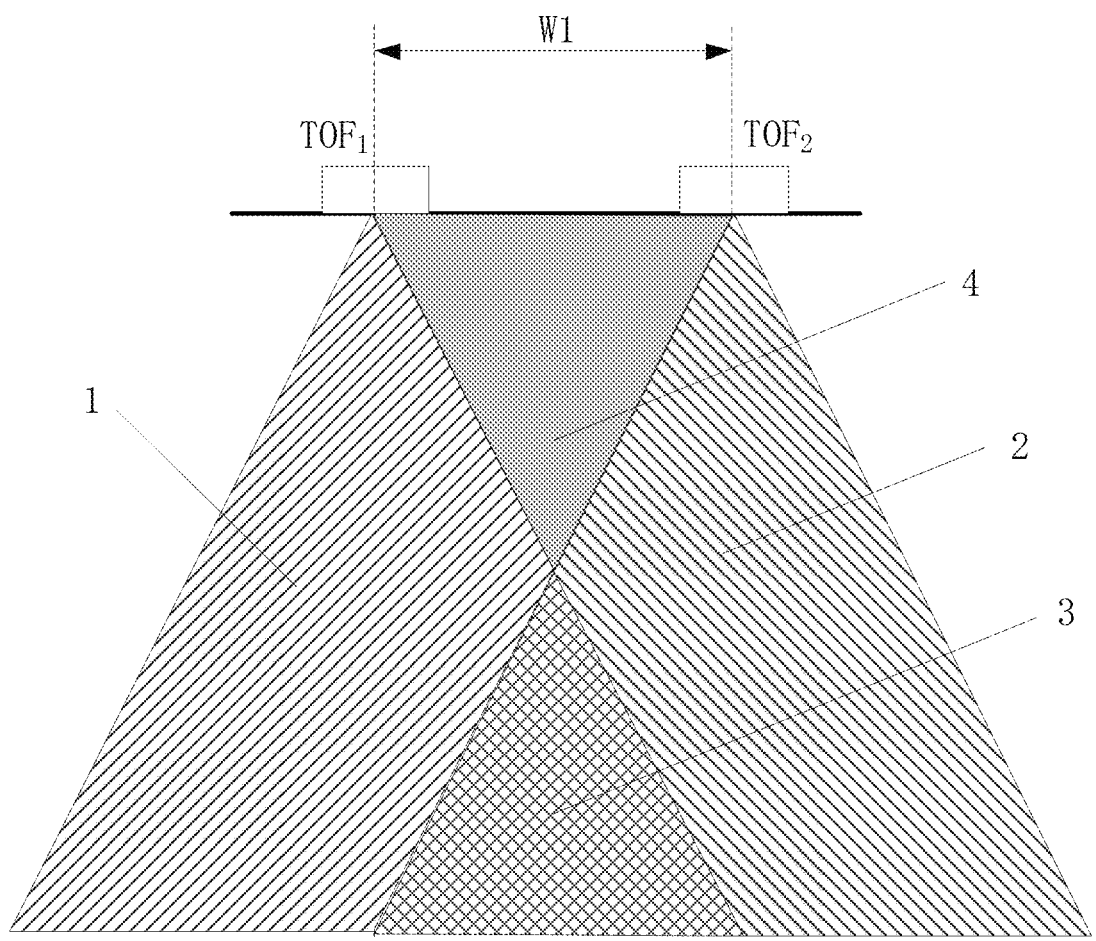
FIG. 1 is a schematic structure diagram of a gesture recognition apparatus provided by an embodiment of the present disclosure.

In order to describe the present disclosure more clearly, the present disclosure will be further described below with reference to preferred embodiments and accompanying drawings. Similar parts in the drawings are represented by the same reference numerals. Those skilled in the art should understand that the content specifically described below is illustrative and not restrictive, and should not be constructed as limiting the protection scope of the present disclosure.

In related art, a distance measurement sensor on the basis of a time of flight (TOF) measurement principle achieves scanning distance measurement through cooperation of a laser and a plurality of sets of optical lenses. At present, there are problems of a complex structure, a high cost and false recognition both in gesture recognition by the distance measurement sensors as short-distance gesture movement recognition necessarily requires the plurality of distance measurement sensors generally, and in gesture recognition through occlusion or occlusion time recognition by the distance measurement sensors. In response to the above problems, embodiments of the present disclosure provide a gesture recognition solution on the basis of cooperative work of multiple distance sensors.

As shown in FIG. 1, an embodiment of the present disclosure provides a gesture recognition apparatus, including a controller (not shown in the figure), a first distance sensor TOF1 and a second distance sensor TOF2, wherein the first distance sensor TOF1 and the second distance sensor TOF2 are arranged in the same plane; main axes of the first distance sensor TOF1 and the second distance sensor TOF2 are parallel to each other and perpendicular to the plane; and a distance between the first distance sensor TOF1 and the second distance sensor TOF2 is a first spacing W1. The first distance sensor TOF1 is configured to measure first distances of a gesture to be measured within a first preset distance. The second distance sensor is configured to measure second distances of the gesture to be measured within a second preset distance. The controller recognizes the gesture to be measured according to a first trajectory formed by the plurality of first distances measured by the first distance sensor within a first preset time, a second trajectory formed by the plurality of second distances measured by the second distance sensor within the first preset time, and the first trajectory and the second trajectory as well as a position relationship between first distance sensor and the second distance sensor.

Figure 2:
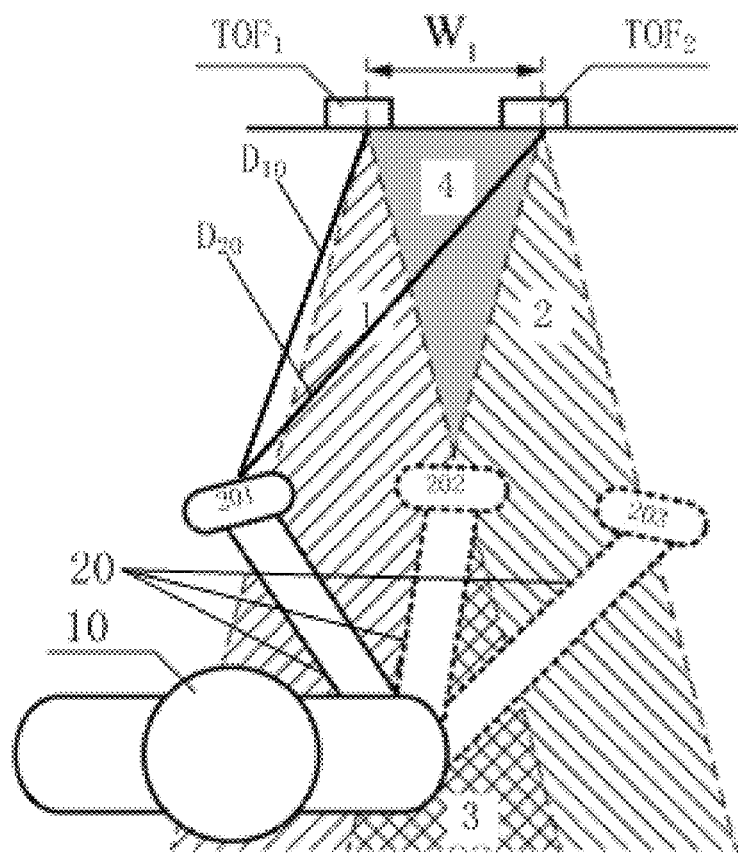
FIG. 2 is a schematic diagram of a gesture recognition principle of a gesture recognition apparatus provided by an embodiment of the present disclosure.
Figure 3:
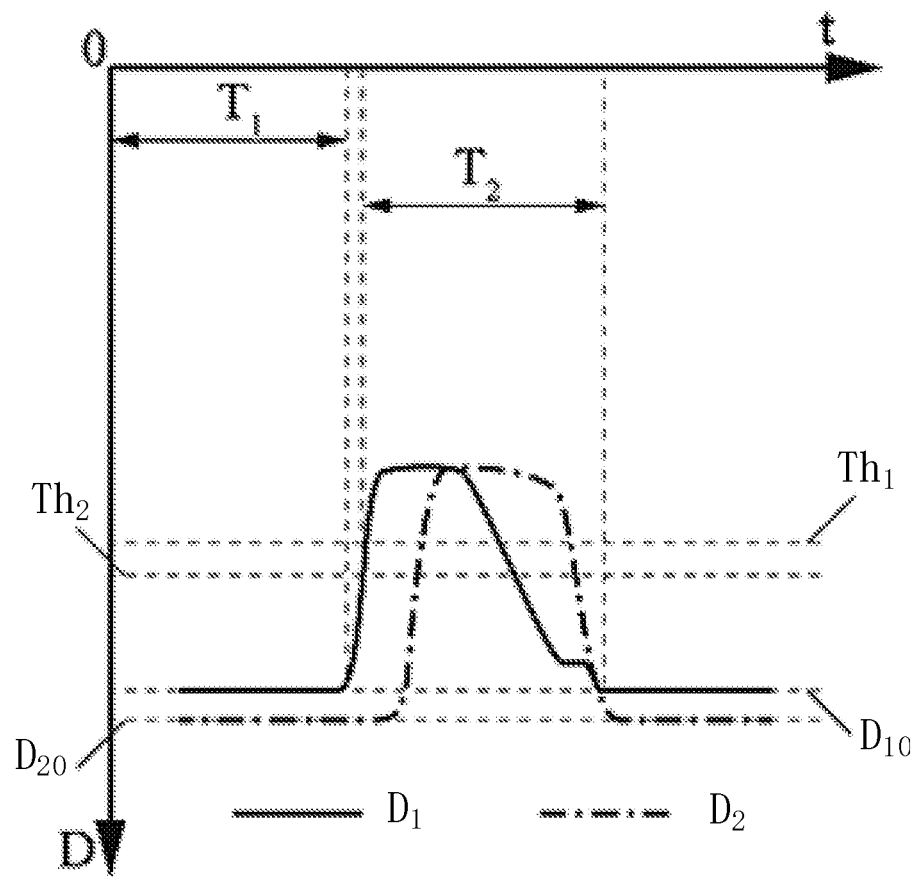
FIG. 3 is a schematic diagram of a distance measurement result of two distance sensors in the gesture recognition apparatus shown in FIG. 2.

In a specific example, as shown in FIGS. 2 and 3, the gesture recognition apparatus includes two distance sensors, namely, the first distance sensor TOF1 and the second distance sensor TOF2. Taking a centroid (the center of mass) of the distance sensor as a reference point, the TOF1 and the TOF2 are mounted in the same plane; main axes of the TOF1 and the TOF2 are parallel to each other and perpendicular to the plane; and the TOF1 and the TOF2 are located on the same horizontal line with a spacing of W1. In the present embodiment, the two distance sensors have the same field angle. View fields of the two distance sensors are the same conical area. The first distance sensor TOF1 can measure an object within a view field 1; the second distance sensor TOF2 can measure an object within a view field 2; and the TOF1 and the TOF2 have an overlapping view field area 3. The TOF1 and the TOF2 have a blind zone 4 close to the mounting plane. Neither of the TOF1 and the TOF2 can sense an object located within the blind zone 4.

Using the TOF1 and the TOF2 to measure the gesture to be measured means that the gesture to be measured is sensed by the TOF1 and the TOF2, respectively. Assuming a movement range of the gesture to be measured is symmetrical about a central axis of the two distance sensors, the gesture to be measured needs to pass through the overlapping view field area 3 of the two distance sensors. In other words, a minimum movement length of the gesture to be measured needs to be greater than or equal to a width of the overlapping view field area 3.

The larger the field angles of the TOF1 and the TOF2 are, the wider the detection range is. The longer the first spacing W1 between the TOF1 and the TOF2 is, the wider the detection range is, and accordingly, the larger the minimum movement length of the gesture to be measured is.

In the present embodiment, in a case where a maximum measurement distance between the TOF1 and the TOF2 is 2 m, from the practical application point of view, within the view fields of the TOF1 and the TOF2, if a field angle of each of the TOF1 and the TOF2 is set to 30°, a first spacing W1 to 20 cm, and a minimum movement distance of the gesture to be measured to 30 cm, a maximum gesture recognition distance of the TOF1 and the TOF2 is (30 cm+20 cm)/(2*tan (30°/2))=93 cm. Meanwhile, in order to avoid false recognition, a maximum movement time of the gesture to be measured is set as a first preset time according to a movement time of the gesture to be measured. In the present embodiment, the first preset time is 3 s. That is, only the gesture passing through the view fields of the TOF1 and the TOF2 within 3 s is treated as the gesture to be measured, and other gestures are ignored.

As shown in FIGS. 2 and 3, the gesture 20 to be measured passes through the TOF1 and the TOF2 via positions 201, 202 and 203 within the first preset time. Within the first preset time, when the gesture to be measured enters the view field of the TOF1, the TOF1 measures the gesture to be measured with a first preset distance D10 as a criterion, and outputs a first distance between the gesture to be measured and the TOF1. When the gesture to be measured passes through the view field of the TOF1, the TOF1 outputs first distances of a plurality of gestures to be measured; and the controller receives the plurality of first distances to form a first trajectory. Similarly, the TOF2 measures the gesture to be measured with a second preset distance D20 as a criterion, and outputs a second distance between the gesture to be measured and the TOF2; and the controller forms a second trajectory according to a plurality of second distances obtained when the gesture to be measured passes through the view field of the TOF2.

The controller can recognize the gesture to be measured according to the first trajectory and the second trajectory as well as the position relationship between the first distance sensor TOF1 and the second distance sensor TOF2. Specifically, when the gesture to be measured passes through the TOF1 and the movement of the gesture to be measured changes from distant to near and then from near to distant relative to the TOF1, the first trajectory forms a first distant-near-distant wave trough trajectory in chronological order. Similarly, when the gesture to be measured passes through the TOF2, the second trajectory forms a second distant-near-distant wave trough trajectory in chronological order. Therefore, according to the sequential order of wave troughs appearing in the first wave trough trajectory and the second wave trough trajectory, and the position relationship between the TOF1 and the TOF2, the controller can recognize the gesture to be measured.

In the present embodiment, as shown in FIG. 2, the gesture to be measured enters the view field of the TOF1 from the position 201, passes through the view field of the TOF1 at the position 202 to enter the view field of the TOF2, and passes through the view field of the TOF2 at the position 203. As shown in FIG. 3, the TOF1 measures a first trajectory D1 with the first wave trough trajectory formed by first distances output by the gesture to be measured; the TOF2 measures a second trajectory D2 with the second wave trough trajectory formed by second distances output by the gesture to be measured; and the first wave trough trajectory D1 precedes the second wave trough trajectory D2. Meanwhile, as the TOF1 and the TOF2 are located on the same horizontal line in the same plane and the TOF1 is located on the left of the TOF2, the controller recognizes that the gesture to be measured is from the TOF1 to the TOF2. As shown in FIG. 2, the gesture to be measured is from left to right.

Figure 4:
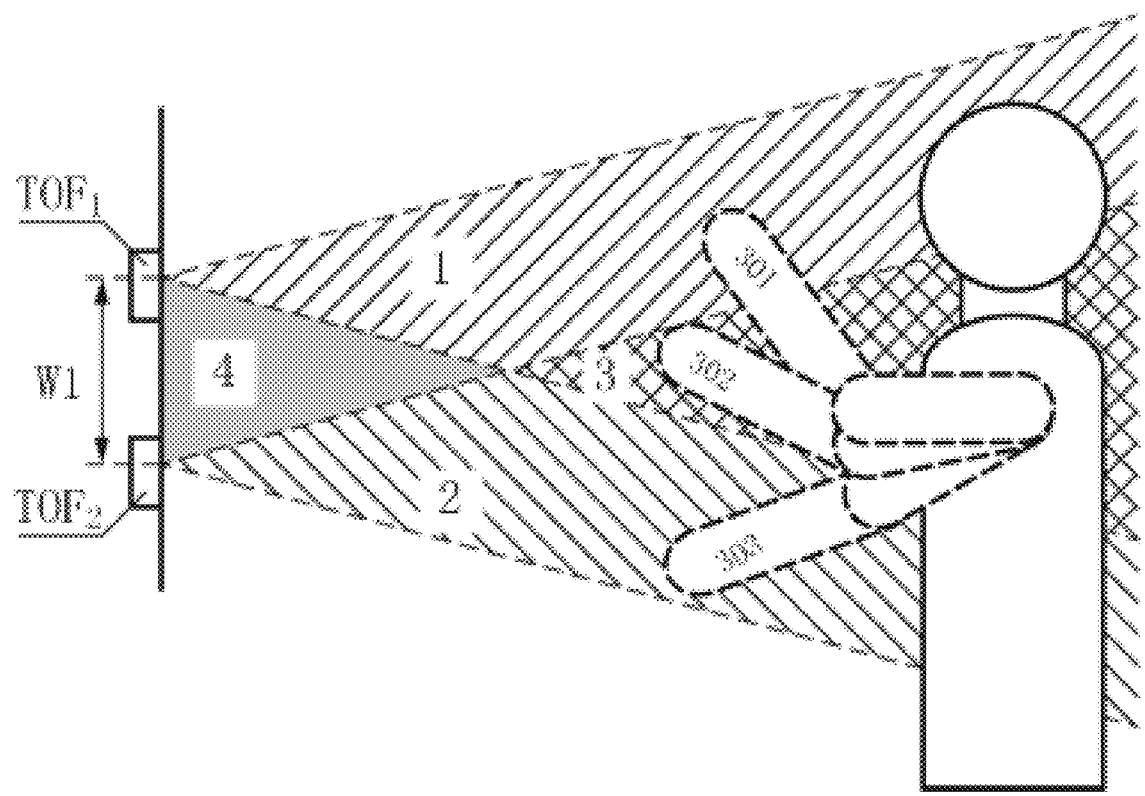
FIG. 4 is a schematic diagram of a gesture recognition principle of a gesture recognition apparatus provided by another embodiment of the present disclosure.
Figure 5:
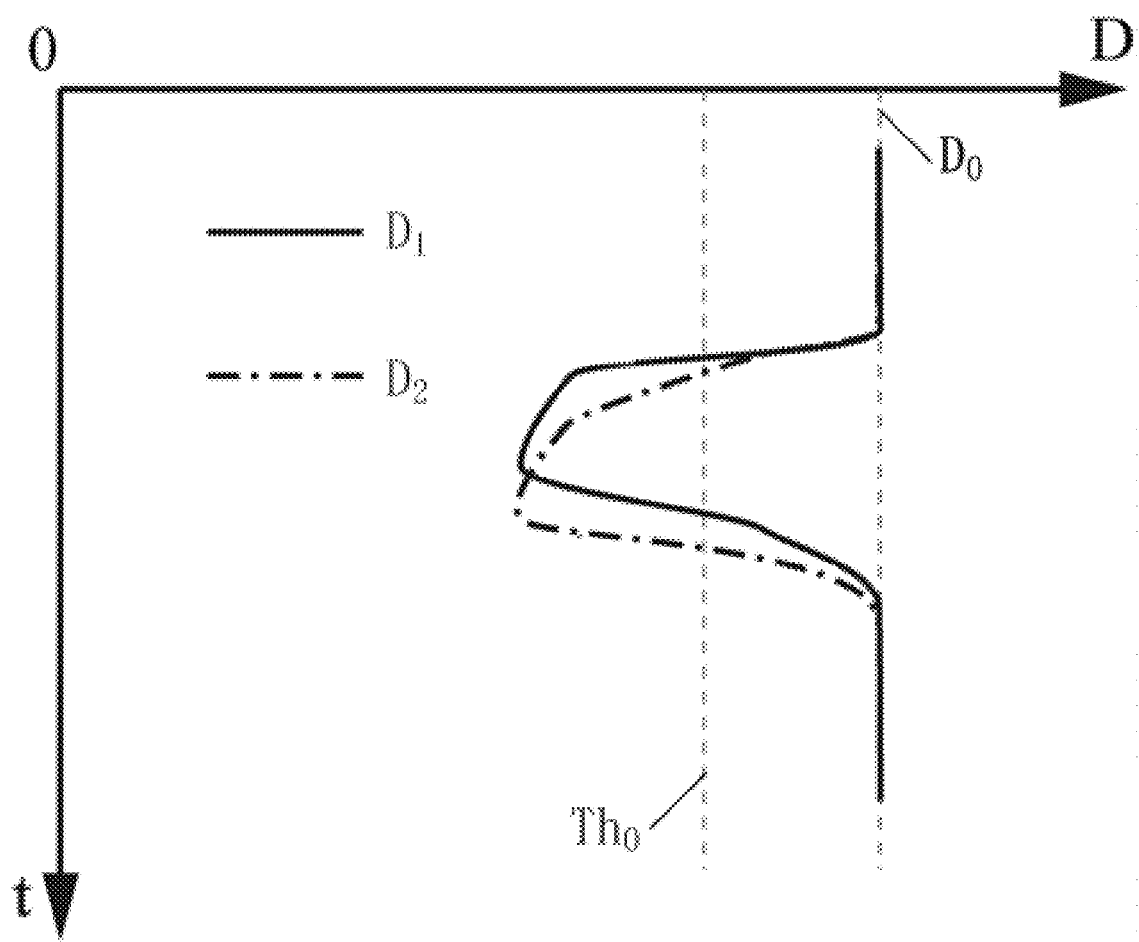
FIG. 5 is a schematic diagram of a distance measurement result of two distance sensors in the gesture recognition apparatus shown in FIG. 4.

In another specific example, as shown in FIGS. 4 and 5, the TOF1 and the TOF2 are mounted in the same plane; main axes of the TOF1 and the TOF2 are parallel to each other and perpendicular to the plane; and the TOF1 and the TOF2 are located on the same vertical line with a spacing of W1. The TOF1 and the TOF2 measure the gesture to be measured with the same distance D0 as a criterion. Within the first preset time, the TOF1 and the TOF2 respectively measure distances of the gesture to be measured in their respective view fields. When entering the view field of the TOF1 from a position 301, the gesture to be measured passes through the view field of the TOF1 at a position 302 to enter the view field of the TOF2, and passes through the view field of the TOF2 at a position 303. As shown in FIG. 5, the TOF1 measures a first trajectory D1 with the first wave trough trajectory formed by first distances output by the gesture to be measured; the TOF2 measures a second trajectory D2 with the second wave trough trajectory formed by second distances output by the gesture to be measured; and the first wave trough trajectory D1 precedes the second wave trough trajectory D2. Meanwhile, as the TOF1 and the TOF2 are located on the same vertical line in the same plane and the TOF1 is located above the TOF2, the controller recognizes that the gesture to be measured is from the TOF1 to the TOF2. As shown in FIG. 4, the gesture to be measured is from top to bottom.

It is worth noting that the above two embodiments are only configured to describe the specific implementations of the present disclosure. The positions of the TOF1 and the TOF2 are not limited in the present disclosure, and preferably, are located on the same horizontal line or vertical line. When the two distance sensors approximately located on the same horizontal line are configured to recognize the gesture to be measured, it can be recognized that the direction of the gesture to be measured is horizontal, namely from left to right or from right to left. Similarly, when the two distance sensors approximately located on the same vertical line are configured to recognize the gesture to be measured, it can be recognized that the direction of the gesture to be measured is vertical, namely from top to bottom or from bottom to top.

Figure 6:
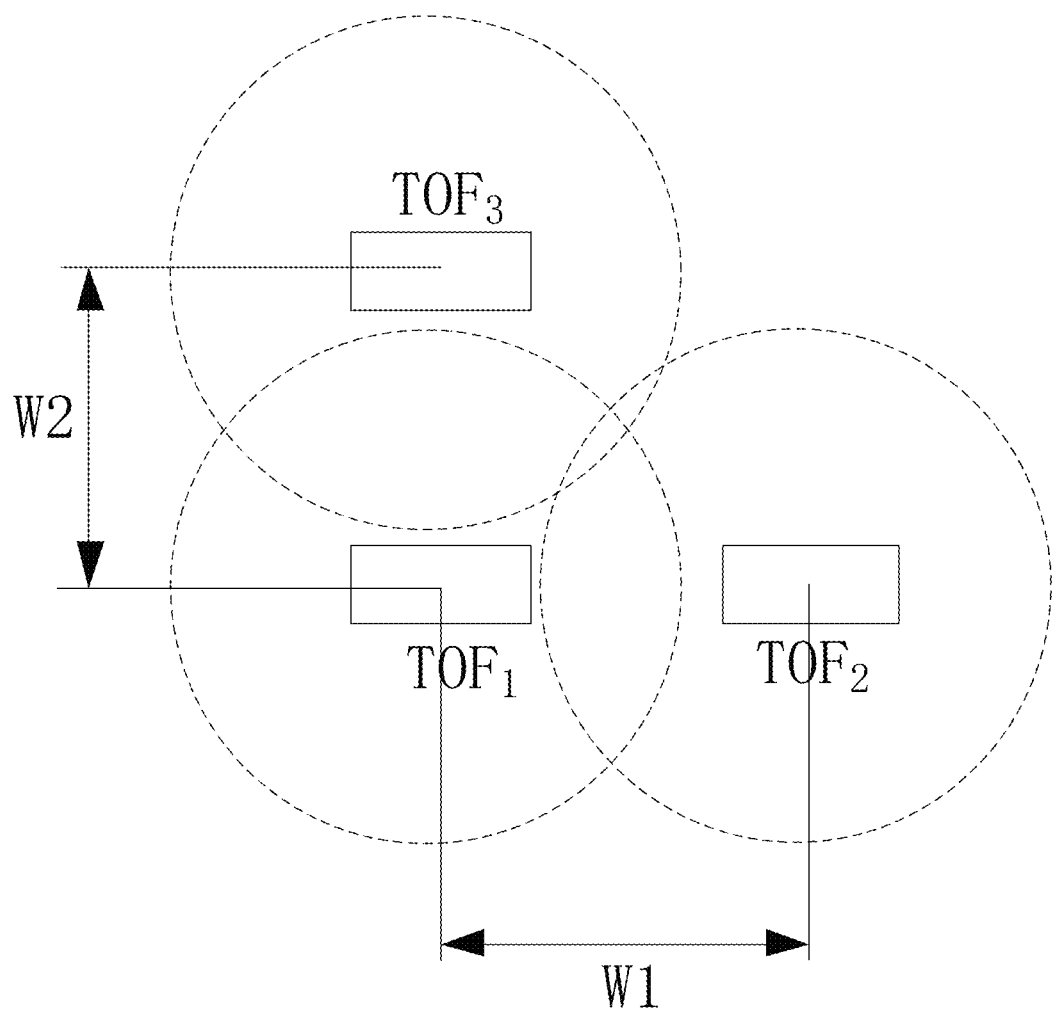
FIG. 6 is a schematic structure diagram of a gesture recognition apparatus provided by yet another embodiment of the present disclosure.
Figure 7:
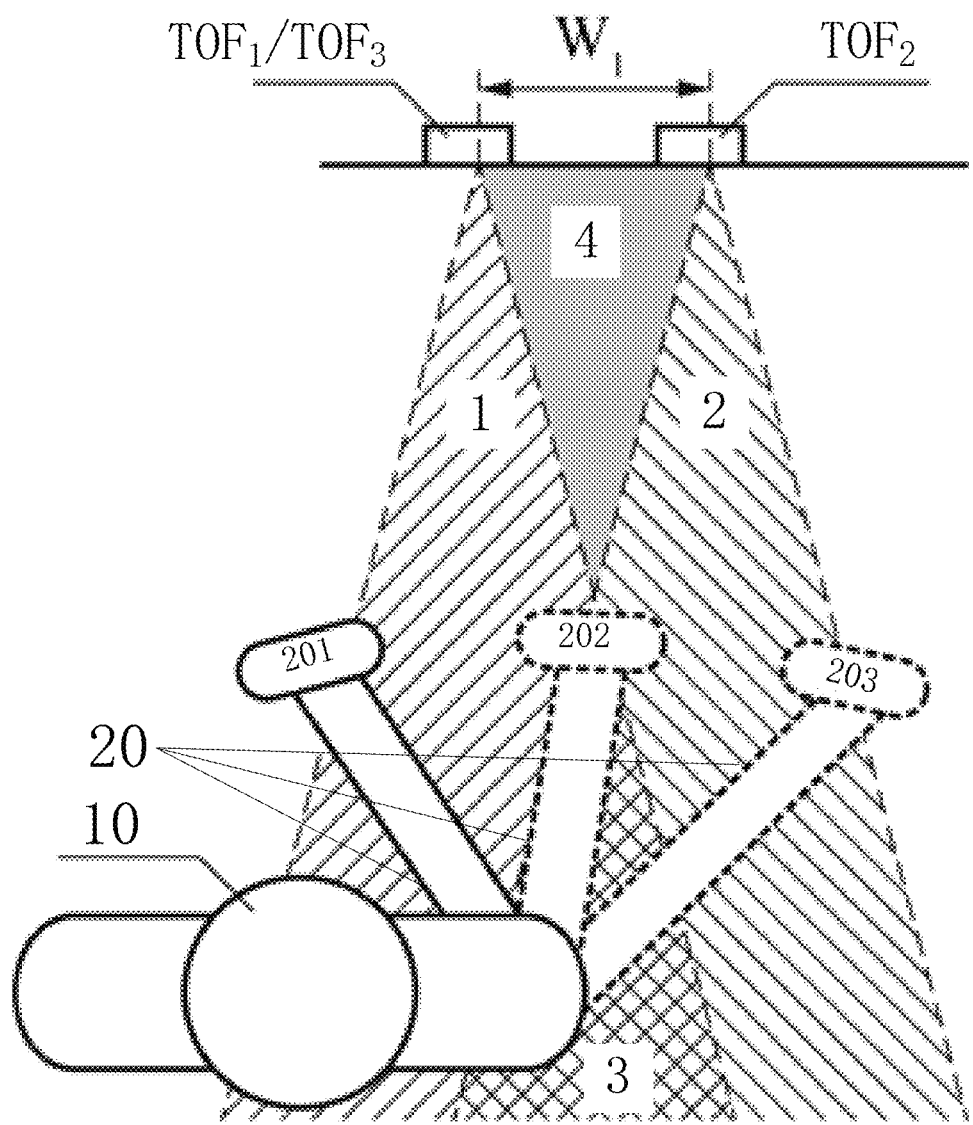
FIG. 7 is a schematic diagram of a gesture recognition principle of a gesture recognition apparatus provided by still another embodiment of the present disclosure.
Figure 8:
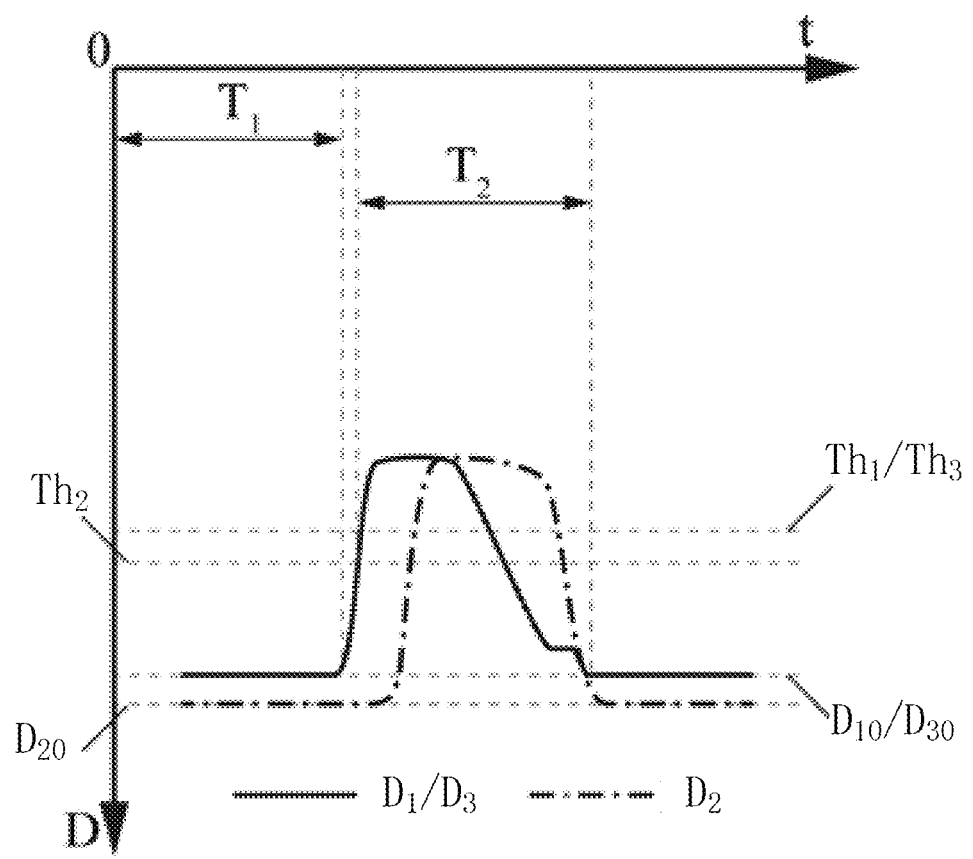
FIG. 8 is a schematic diagram of a distance measurement result of two distance sensors in the gesture recognition apparatus shown in FIG. 7.

In an optional embodiment, as shown in FIGS. 6, 7 and 8, the gesture recognition apparatus further includes at least one third distance sensor TOF3 located in the same plane as the first distance sensor TOF1 and the second distance sensor TOF2. A main axis of the third distance sensor TOF3 is parallel to the main axes of the first distance sensor TOF1 and the second distance sensor TOF2 and is perpendicular to the plane. A distance from the third distance sensor TOF3 to a connection line between the first distance sensor TOF1 and the second distance sensor TOF2 is a second spacing W2. The third distance sensor TOF3 is configured to measure a third distance of the gesture to be measured within a third preset distance. The controller forms a third trajectory according to a plurality of third distances measured by the third distance sensor within the first preset time, and recognizes the gesture to be measured according to the first trajectory, the second trajectory and the third trajectory as well as a position relationship between the first distance sensor, the second distance sensor and the third distance sensor.

In the present embodiment, FIG. 6 is a front view of the gesture recognition apparatus. The third distance sensor TOF3 is located in the plane of the TOF1 and the TOF2; and the TOF3 and the TOF1 are located on the same vertical line. A spacing between the TOF3 and the TOF1 is W2; and meanwhile, the main axis of the TOF3 is parallel to the main axes of the TOF1 and the TOF2 and is perpendicular to the plane.

On the basis of the above embodiments, as shown in FIG. 7, when the gesture to be measured passes through the view fields of the TOF1, the TOF2 and the TOF3, the controller not only forms the first and second trajectories, but also forms a third trajectory according to a plurality of third distances output when the TOF3 measures the gesture to be measured. In addition, the third trajectory also forms a distant-near-distant third wave trough trajectory in chronological order within the first preset time. As shown in FIG. 5, the gesture to be measured enters the view fields of the TOF1 and the TOF3 from the position 201, passes through the view fields of the TOF1 and the TOF3 at the position 202 to enter the view field of the TOF2, and passes through the view field of the TOF2 at the position 203. As shown in FIG. 7, the TOF1 senses the first trajectory D1 with the first wave trough trajectory formed by the first distances output by the gesture to be measured; the TOF3 senses the third trajectory D3 with the third wave trough trajectory formed by the third distances output by the gesture to be measured; and the first trajectory D1 and the third trajectory D3 coincide. The TOF2 senses the second trajectory D2 with the second wave trough trajectory formed by the second distances output by the gesture to be measured; and the first trajectory D1 and the third trajectory D3 appear simultaneous or sequentially, and both precede the second wave trough trajectory D2. Meanwhile, as the TOF1 and the TOF3 are located on the same vertical line in the same plane, the TOF1 and the TOF2 are located on the same horizontal line in the same plane, and the TOF1 and the TOF3 are located on the left of the TOF2, the controller recognizes that the gesture to be measured is from the TOF1 to the TOF2. As shown in FIG. 7, the gesture to be measured is from left to right; or otherwise, if the second wave trough trajectory precedes the first wave trough trajectory and the third wave trough trajectory, the gesture to be measured is from right to left.

Similarly, in the embodiment, if the third wave trough trajectory precedes the first wave trough trajectory D1 and the second wave trough trajectory D2, and the first wave trough trajectory D1 and the second wave trough trajectory D2 appear simultaneously or continuously, the controller judges that the gesture to be measured is from top to bottom according to the position relationship between the TOF1, the TOF2 and the TOF3; or otherwise, if the first wave trough trajectory D1 and the second wave trough trajectory D2 precede the third wave trough trajectory, and appear simultaneously or continuously, the controller judges that the gesture to be measured is from bottom to top.

Figure 9:
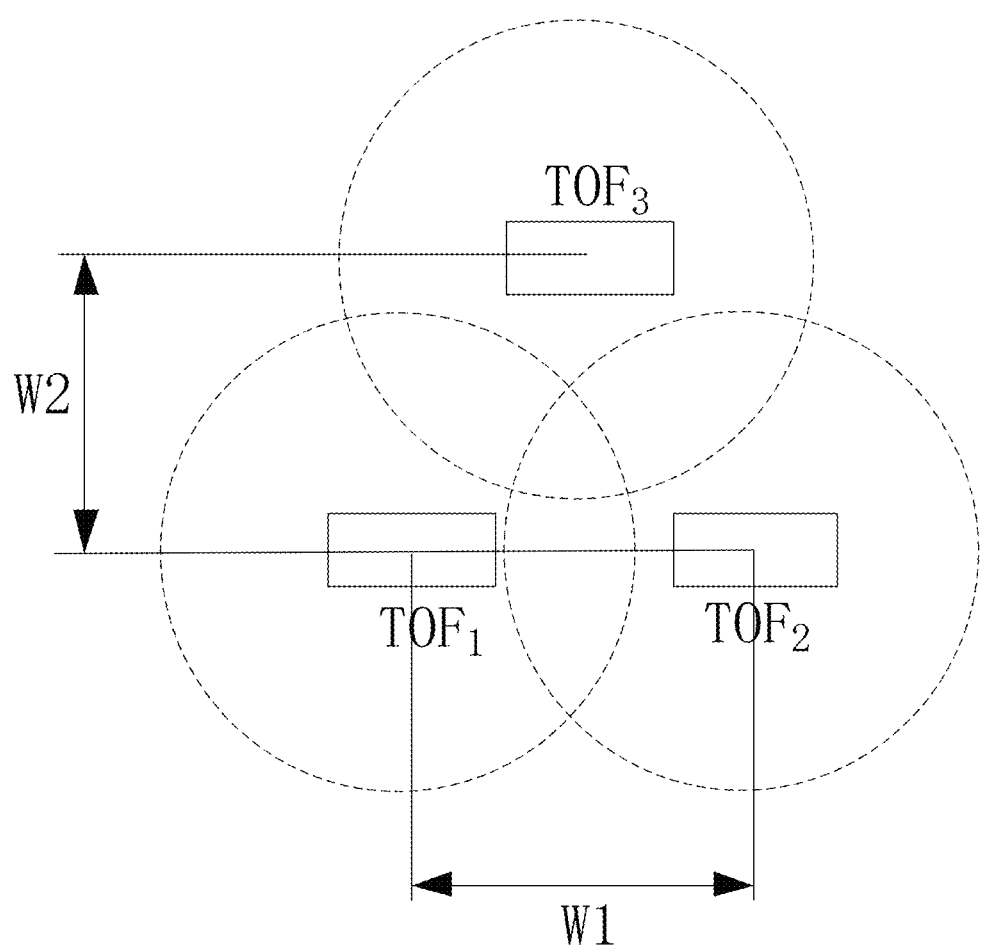
FIGS. 9 and 10 show a schematic structure diagram of a gesture recognition apparatus provided by yet still another embodiment of the present disclosure.
Figure 10:
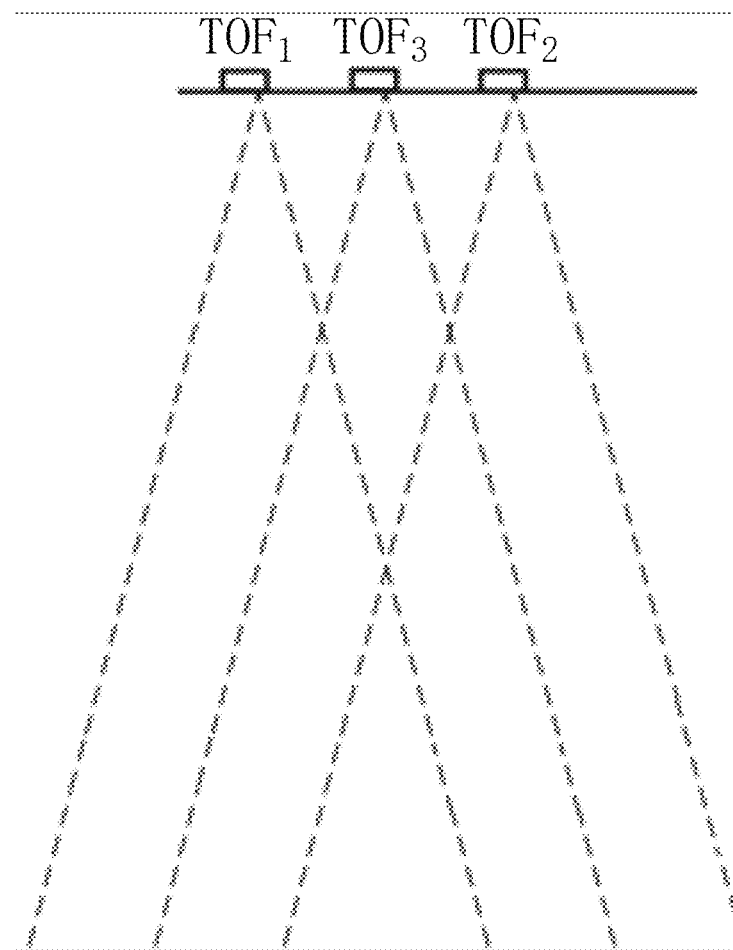

In an optional embodiment, as shown in FIGS. 9 and 10, the third distance sensor, the first distance sensor and the second distance sensor are located at three vertexes of an equilateral triangle, respectively.

In the present embodiment, FIG. 9 is a front view, and FIG. 10 is a top view. The mounting positions of the TOF1, the TOF2 and the TOF3 are located at three vertexes of an equilateral triangle, respectively. View fields of the TOF1, the TOF2 and the TOF3 are shown in FIGS. 9 and 10. It should be understood by those skilled in the art that if the first wave trough trajectory precedes the third wave trough trajectory and the third wave trough trajectory precedes the second wave trough trajectory, the controller recognizes that the gesture to be measured is from the TOF1 to the TOF2, namely from left to right; or otherwise, the controller recognizes that the gesture to be measured is from the TOF2 to the TOF1, namely, from right to left. If the first wave trough trajectory and the second wave trough trajectory precede the third wave trough trajectory, and appear simultaneously or continuously, the controller recognizes that the gesture to be measured is from the sides of the TOF1 and the TOF2 to the TOF3, namely from bottom to top; or otherwise, the controller recognizes that the gesture to be measured is from the TOF3 to the sides of the TOF1 and the TOF2, namely from top to bottom. That is, in the present embodiment, the gesture to be measured passing through the view fields of the TOF1, the TOF2 and the TOF3 can be recognized, and may be from top to bottom or from bottom to top, or from left to right or from right to left.

It is worth noting that the above two embodiments in which the mounting positions of the three distance sensors are set to form a right triangle or an equilateral triangle illustrate the specific implementations of the present disclosure. Those skilled in the art should understand that when a distance from the third distance sensor to the connection line between the first distance sensor and the second distance sensor is the second spacing, that is, when the TOF1, the TOF2 and the TOF3 are not on the same horizontal line or vertical line, the controller can recognize the gesture to be measured in four directions perpendicular to the mounting plane, so that the structure of a gesture recognition apparatus with distance sensors in the prior art is simplified, and the cost is reduced.

In addition, the above embodiments adopt three distance sensors. That is, the gesture to be measured in the four directions perpendicular to the mounting plane is recognized through the minimum number of distance sensors. In the present disclosure, the number of used distance sensors is not limited. Those skilled in the art should select an appropriate number of distance sensors according to actual application and recognition accuracy requirements, so as to meet the design criteria of recognizing the gesture to be measured, which will not be repeated herein.

Considering a need of cooperative work of a plurality of distance sensors at the same time, in an optional embodiment, the distance sensors share one light source. In the present embodiment, by arranging one common light source for the plurality of distance sensors, namely, allowing receivers of the plurality of distance sensors to keep time synchronization with the light source, the cooperative work of the plurality of distance sensors is realized.

Considering the need of cooperative work of a plurality of distance sensors at the same time, in another optional embodiment, the controller controls each distance sensor to measure a distance in turn within a measurement cycle. In the present embodiment, by setting the plurality of distance sensors to work in turn, namely, dividing the measurement cycle into time slots corresponding to the plurality of distance sensors respectively for time division multiplexing, the cooperative work of the plurality of distance sensors is realized.

Considering the need of cooperative work of a plurality of distance sensors at the same time, in another optional embodiment, working frequency bands of the distance sensors are different. In the present embodiment, the different distance sensors are set at different working frequency bands and cooperate with different optical filters, so that the cooperative work of the plurality of distance sensors is realized.

Corresponding to the gesture recognition apparatus provided by any of the above embodiments, an embodiment of the present disclosure further provides a gesture recognition method using the gesture recognition apparatus. Since the gesture recognition method provided by the present embodiment corresponds to the gesture recognition apparatus provided by any of the above embodiments, the above implementations are also applicable to the gesture recognition method provided by the present embodiment, and will not be described in detail herein.

Figure 11:
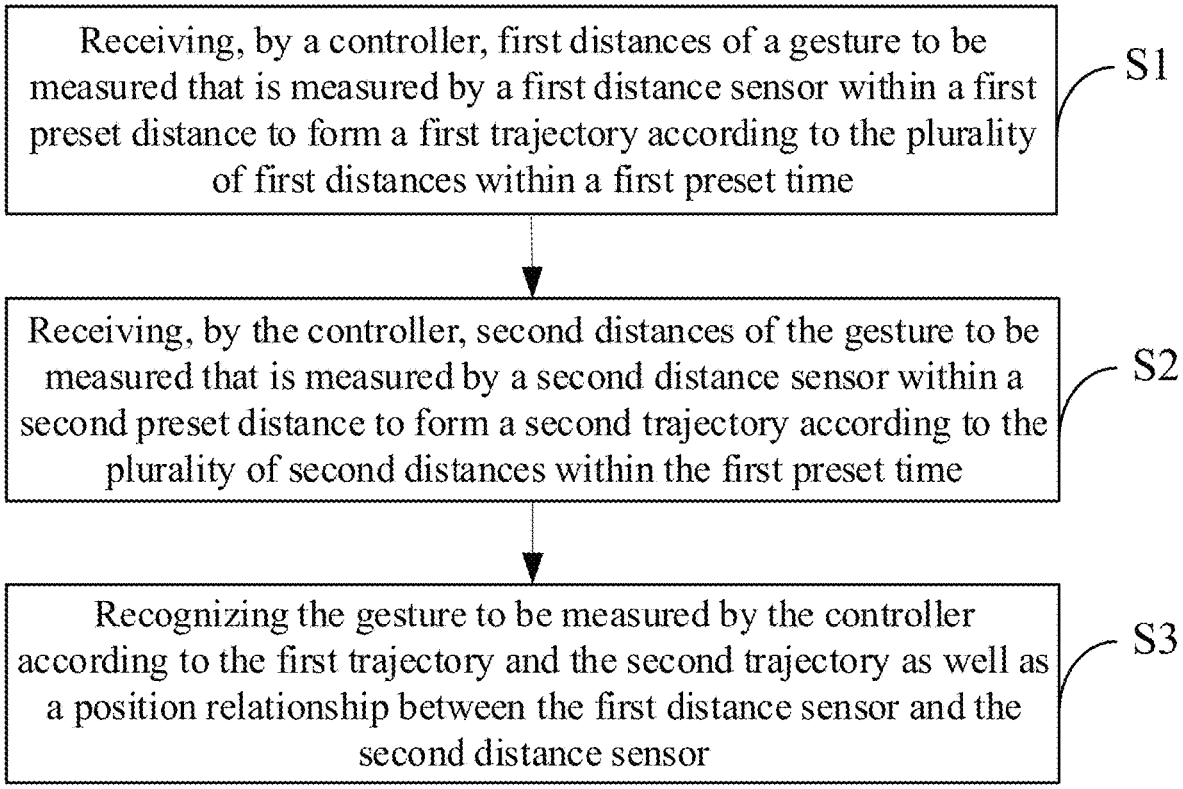
FIG. 11 is a flow chart of a gesture recognition method provided by an embodiment of the present disclosure.

As shown in FIG. 11, an embodiment of the present disclosure further provides a gesture recognition method using the gesture recognition apparatus. The method includes steps S1, S2 and S3.

In step S1, first distances of a gesture to be measured that is measured by a first distance sensor within a first preset distance are received by a controller to form a first trajectory according to the plurality of first distances within a first preset time.

In step S2, second distances of the gesture to be measured that is measured by a second distance sensor within a second preset distance are received by a controller to form a second trajectory according to the plurality of second distances within the first preset time.

In step S3, the gesture to be measured is recognized by the controller according to the first trajectory and the second trajectory as well as a position relationship between the first distance sensor and the second distance sensor.

In the present embodiment, the first distance sensor TOF1 and the second distance sensor TOF2 mounted in the same plane at a first spacing W1 are configured to measure distances of the gesture to be measured within view fields of the TOF1 and the TOF2. The TOF1 measures the plurality of first distances which is output by the gesture to be measured and which represents distances of the gesture to be measured; the TOF2 measures the plurality of second distances which is output by the gesture to be measured and which represents distances of the gesture to be measured; and the controller receives the plurality of first distances to form the first trajectory, and receives the plurality of second distances to form the second trajectory. Meanwhile, the controller recognizes the gesture to be measured according to the first trajectory and the second trajectory as well as the position relationship between the first distance sensor and the second distance sensor. Thus, the gesture to be measured in two directions is recognized only by two distance sensors.

In an optional embodiment, recognizing the gesture to be measured by the controller according to the first trajectory and the second trajectory as well as the position relationship between the first distance sensor and the second distance sensor further includes: if the controller judges that a first distant-near-distant wave trough trajectory exists in the first trajectory in chronological order and a second distant-near-distant wave trough trajectory exists in the second trajectory in chronological order, recognizing the gesture to be measured by the controller according to a sequential order of the first wave trough trajectory and the second wave trough trajectory as well as the position relationship between the first distance sensor and the second distance sensor.

As shown in FIGS. 2 and 3, the gesture 20 to be measured passes through the TOF1 and the TOF2 via positions 201, 202 and 203 within the first preset time. Within the first preset time, the movement of the gesture to be measured changes from distant to near and then from near to distant relative to the TOF1; and the first distant-near-distant wave trough trajectory exists in the first trajectory in chronological order. Similarly, the controller forms the second trajectory according to the plurality of second distances output by the gesture to be measured and sensed by the TOF2; and the second distant-near-distant wave trough trajectory exists in the second trajectory in chronological order. Meanwhile, as show in FIG. 2, as the TOF1 and the TOF2 are located on the same horizontal line and the TOF1 is located on the left of the TOF2, the gesture to be measured is from left to right when the first wave trough trajectory precedes the second wave trough trajectory; or otherwise, the gesture to be measured is from right to left. Similarly, as the TOF1 and the TOF2 are located on the same horizontal line in the same plane and the TOF1 is located above the TOF2, the gesture to be measured is from top to bottom when the first wave trough trajectory precedes the second wave trough trajectory; or otherwise, the gesture to be measured is from bottom to top. Therefore, the gesture to be measured in two directions can be recognized by the two distance sensors.

Considering that a user who made the gesture to be measured also appears in the view field of the distance sensor, in order to further accurately recognize the gesture to be measured, in an optional embodiment, prior to receiving, by the controller, the first distances of the gesture to be measured that is measured by the first distance sensor within the first preset distance to form the first trajectory according to the plurality of first distances within the first preset time, the gesture recognition method further includes: acquiring a maximum gesture recognition distance of the first distance sensor and the second distance sensor by the controller according to the first spacing between the first distance sensor and the second distance sensor, field angles of both the first distance sensor and the second distance sensor, and a preset movement length of the gesture to be measured. If both the first distance and the second distance are less than the maximum gesture recognition distance, the gesture recognition method further includes: receiving, by the controller, a plurality of first distances measured by the first distance sensor within a second preset time, setting an average value of the plurality of first distances as a first human body distance if a difference value between the plurality of first distances is less than a preset distance threshold, and determining the first preset distance by the controller according to the first human body distance; and receiving, by the controller, a plurality of second distances measured by the second distance sensor within the second preset time, setting an average value of the plurality of second distances as a second human body distance if a difference value between the plurality of second distances is less than the preset distance threshold, and determining the second preset distance by the controller according to the second human body distance.

In the present embodiment, first, the maximum gesture recognition distance of the TOF1 and the TOF2 is calculated according to the position relationship between the TOF1 and the TOF2 as well as the minimum movement distance of the gesture to be measured; second, it is judged whether the user who made the gesture is detected by the TOF1 and the TOF2; third, it is judged whether the first distance measured by the TOF1 and the second distance measured by the TOF2 are less than the maximum gesture recognition distance; and finally, the first preset distance of the TOF1 and the second preset distance of the TOF2 are determined accordingly.

Based on the above embodiment in which the field angle of each of the TOF1 and the TOF2 is set to 30°, the first spacing W1 to 20 cm, and the minimum movement distance of the gesture to be measured to 30 cm, the maximum gesture recognition distance of the TOF1 and the TOF2 is 93 cm.

As shown in FIGS. 2 and 3, it is assumed that the user stays for the second preset time (5 s in the present embodiment) after entering the view fields of the TOF1 and the TOF2. That is, the TOF1 measures a plurality of first distances output by the human body within 5 s; and meanwhile, the difference value between the plurality of first distances is less than the distance threshold (5 cm in the present embodiment). Similarly, the TOF2 measures a plurality of second distances output by the human body within 5 s, and the difference value between the plurality of second distances is less than 5 cm. Thus, the controller judges that the user who made the gesture is detected by the TOF1 and the TOF2; and the average value of the first distances is set to the first human body distance, and the average value of the second distances is set to the second human body distance.

If both the first human body distance and the second human body distance are less than the maximum gesture recognition distance, on this basis, in order to further recognize the gesture to be measured, when the distance between a hand and the body of the user is set to 20 cm, the first preset distance of the gesture to be measured sensed by the TOF1 can be obtained by subtracting 20 cm from the first human body distance. Similarly, the second preset distance of the gesture to be measured sensed by the TOF2 can be obtained by subtracting 20 cm from the second human body distance. That is, the TOF1 measures the first distance of the gesture to be measured with the first preset distance as a criterion; and the TOF2 measures the second distance of the gesture to be measured with the second preset distance as a criterion.

As shown in FIGS. 2 and 3, within the time period t1, the controller judges that the human body is detected by the TOF1 at the second preset time, sets the first human body distance D10 according to the average value of the plurality of first distances measured within the second preset time, and obtains the first preset distance Th1 by subtracting 20 cm from the first human body distance D10. Similarly, the controller sets the second human body distance D20 according to the average value of the plurality of second distances measured by the TOF2, and obtains the second preset distance Th2 according to the second human body distance D20. Thus, the TOF1 measures the first distance of the gesture to be measured with the Th1 as a criterion; and the TOF2 measures the second distance of the gesture to be measured with the Th2 as a criterion.

Within the time period t2, when the gesture to be measured passes through the view fields of the TOF1 and the TOF2, the controller forms the first trajectory according to the plurality of first distances output by the gesture to be measured and measured by the TOF1 and forms the second trajectory according to the plurality of second distances output by the gesture to be measured and measured by the TOF2; and the controller judges that the first distant-near-distant wave trough trajectory exists in the first trajectory in chronological order, and the second distant-near-distant wave trough trajectory exists in the second trajectory in chronological order.

In an optional embodiment, the controller uses an edge detection method to judge the first wave trough trajectory and the second wave trough trajectory. In the first trajectory, a distant-to-near value change amplitude with a third preset time is greater than the preset distance threshold, and a near-to-distant value change amplitude with a fourth preset time is greater than the preset distance threshold. In the second trajectory, a distant-to-near value change amplitude with a fifth preset time is greater than the preset distance threshold, and a near-to-distant value change amplitude with a sixth preset time is greater than the preset distance threshold.

Specifically, as shown in FIGS. 2 and 3, in the process that the gesture to be measured moves from distant to near relative to the TOF1, it is detected that a value of the first wave trough trajectory D1 changes from D10 to Th1 within the third preset time; and the controller judges whether a change amplitude (i.e., rising edge) of the first wave trough trajectory D1 is greater than the preset distance threshold. Likewise, in the process that the gesture to be measured moves from near to distant relative to the TOF1, it is detected that a value of the first wave trough trajectory D1 changes from Th1 to D10 within the fourth preset time; and the controller judges whether a change amplitude (i.e., falling edge) of the first wave trough trajectory D1 is greater than the preset distance threshold. Similarly, in the process that the gesture to be measured moves from distant to near relative to the TOF2, it is detected that a value of the second wave trough trajectory D2 changes from D20 to Th2 within the fifth preset time; and the controller judges whether a change amplitude (i.e., rising edge) of the second wave trough trajectory D2 is greater than the preset distance threshold. Likewise, in the process that the gesture to be measured moves from near to distant relative to the TOF2, it is detected that a value of the second wave trough trajectory D2 changes from Th2 to D20 within the sixth preset time; and the controller judges whether a change amplitude (i.e., falling edge) of the second wave trough trajectory D2 is greater than the preset distance threshold. If the above conditions are met, the controller judges that the gesture to be measured is detected by the TOF1 and the TOF2, and recognizes the gesture to be measured according to the sequential order of the first wave trough trajectory and the second wave trough trajectory as well as the position relationship between the TOF1 and the TOF2.

It is worth noting that the third preset time, the fourth preset time, the fifth preset time and the sixth preset time are configured to indicate movement speeds of the gesture to be measured. In the present embodiment, the third preset time, the fourth preset time, the fifth preset time and the sixth preset time are set to 0.1 s, and correspond to two sampling periods of the TOF1 and the TOF2. The above preset times are not limited in the present disclosure, and may be set to the same value or different values. Those skilled in the art should set them according to actual application requirements, which will not be repeated herein.

In another optional embodiment, the controller uses a threshold method to judge the first wave trough trajectory and the second wave trough trajectory. The first trajectory changes from distant to near to be less than the maximum gesture recognition distance, and changes from near to distant to be greater than the maximum gesture recognition distance. The second wave trough trajectory changes from distant to near to be less than the maximum gesture recognition distance, and changes from near to distant to be greater than the maximum gesture recognition distance.

Specifically, as shown in FIGS. 2 and 3, in the process that the gesture to be measured moves from distant to near relative to the TOF1, the controller judges whether a change value (i.e., rising edge) of the first wave trough trajectory D1 is less than the first preset distance Th1. Likewise, in the process that the gesture to be measured moves from near to distant relative to the TOF1, the controller judges whether a change value (i.e., falling edge) of the first wave trough trajectory D1 is greater than the first preset distance Th1. Similarly, in the process that the gesture to be measured moves from distant to near relative to the TOF2, the controller judges whether a change value (i.e., rising edge) of the second wave trough trajectory D2 is less than the second preset distance Th2. Likewise, in the process that the gesture to be measured moves from near to distant relative to the TOF2, the controller judges whether a change value (i.e., falling edge) of the second wave trough trajectory D2 is greater than the second preset distance Th2. If the above conditions are met, the controller judges that the gesture to be measured is detected by the TOF1 and the TOF2, and recognizes the gesture to be measured according to the sequential order of the first wave trough trajectory and the second wave trough trajectory as well as the position relationship between the TOF1 and the TOF2.

Figure 12:
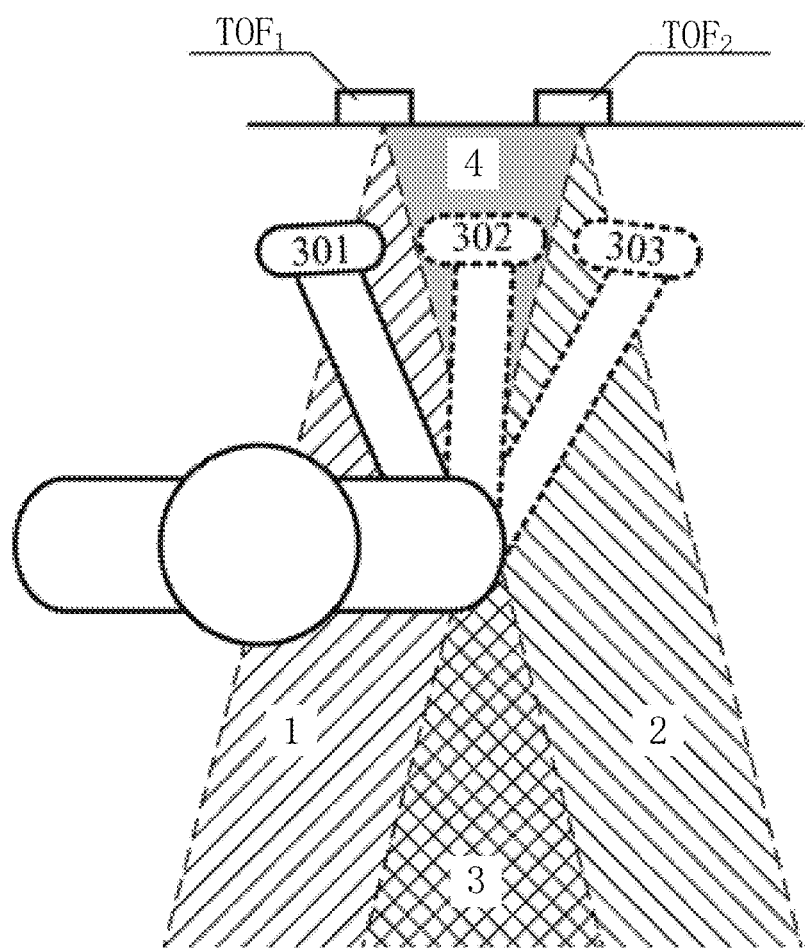
FIG. 12 is a schematic diagram of a gesture recognition principle of a gesture recognition apparatus provided by yet still another embodiment of the present disclosure.
Figure 13:
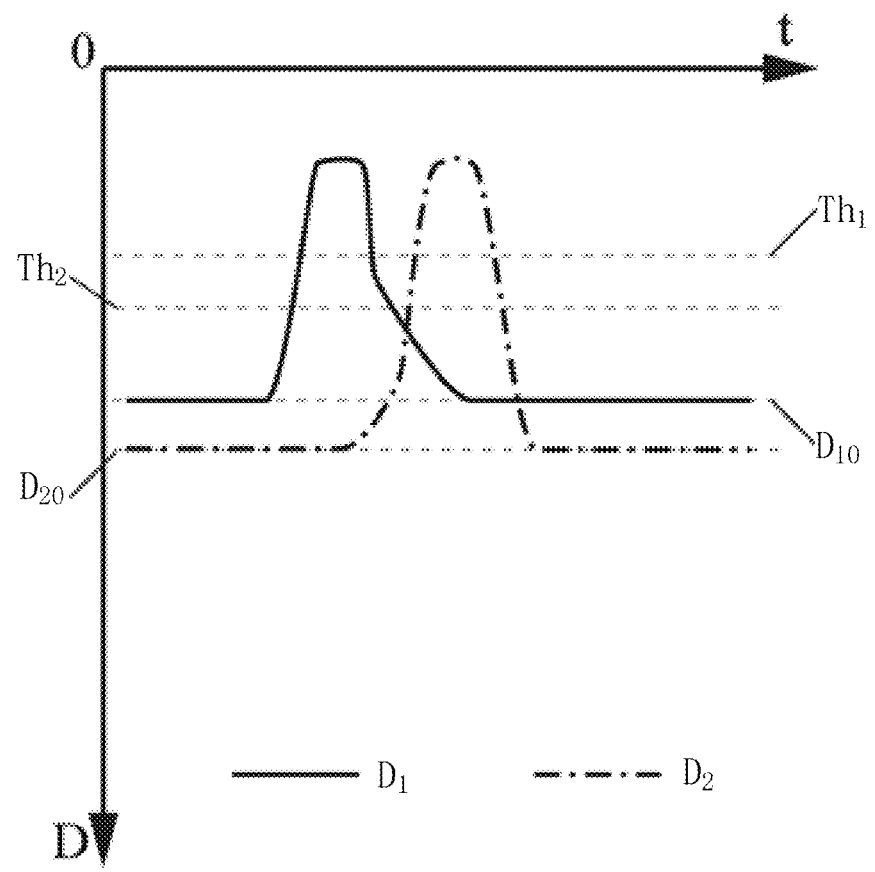
FIG. 13 is a schematic diagram of a distance measurement result of two distance sensors in the gesture recognition apparatus shown in FIG. 12.

When the user is relatively close to the mounting position, in another optional embodiment, as shown in FIGS. 12 and 13, the gesture to be measured passes a blind zone while passing through the TOF1 and the TOF2, and thus, wave troughs successively appear in the formed first and second wave trough trajectories. Other judgment methods are similar, and will not be repeated herein.

Considering that the user is relatively distant from the distance sensor, when a distance between the user's body and the distance sensor exceeds the calculated maximum gesture recognition distance, in another optional embodiment, prior to receiving, by the controller, the first distances of the gesture to be measured that is measured by the first distance sensor within the first preset distance to form the first trajectory according to the plurality of first distances within the first preset time, the gesture recognition method further includes: if the first distance or the second distance is greater than the maximum gesture recognition distance, setting the first preset distance or the second preset distance as the maximum gesture recognition distance.

In the present embodiment, the user is relatively distant from the distance sensor, and the first distance and the second distance measured by the TOF1 and the TOF2 are both greater than the maximum gesture recognition distance. In order to accurately measure the gesture to be measured, the TOF1 uses the maximum gesture recognition distance as a criterion to measure the first distance of the gesture to be measured, and the TOF2 uses the maximum gesture recognition distance as a criterion to measure the second distance of the gesture to be measured.

Considering that the first and second distances sensed by the TOF1 and the TOF2 in the above embodiments are not related to the human body but the gesture to be measured, in order to avoid false recognition of the human body as the gesture to be measured, in an optional embodiment, durations of both the first wave trough and the second wave trough are shorter than a preset wave trough time threshold.

In the present embodiment, in order to distinguish the passing of the human body from the gesture to be measured, when there is no one in the view field of the distance sensor, that is, when the TOF1 and the TOF2 output meaningless large values, a wave trough time threshold is set by counting operation times and operation speeds of a large number of gesture operations of different users. When a wave trough time of the first wave trough trajectory formed by the first distances output by the TOF1 and a wave trough time of the second wave trough trajectory formed by the second distances output by the TOF2 are shorter than the wave trough time threshold, the controller judges that the operation which forms the first wave trough trajectory and the second wave trough trajectory is related to the gesture to be measured, but not the user's body.

Specifically, the formula for calculating the wave trough time threshold is $[L*\tan(\varphi/2)*2]$, wherein L is a wave trough distance value, $\varphi$ is an filed angle of the distance sensor, and V is a minimum movement speed (which is set to 0.5 m/s in the present embodiment) of the gesture to be measured. When a movement speed of the gesture to be measured is greater than or equal to the minimum speed, a view field of one distance sensor can be passed through only by passing the distance of $[L*\tan(\varphi/2)*2]$, and thus, the required time is shorter than the wave trough time threshold.

While a human body passes the distance sensor, the required time is $[L*\tan(\varphi/2)*2+WB]/V$, wherein WB is an estimated value of the width of the human body (which is set to 40 cm in the present embodiment). That is, after passing the distance of $[L*\tan(\varphi/2)*2+WB]$, the human body passes through the view field of one distance sensor. If it is set that the speed of a normal human body passing the distance sensor is less than or equal to the minimum speed, the required time is longer than the wave trough time threshold. Therefore, the human body and the gesture to be measured are distinguished from each other, avoiding false recognition of the gesture to be measured by the controller.

It is worth noting that the present embodiment is only configured to describe a specific implementation of the present disclosure. The present disclosure does not limit the manners for distinguishing the human body passing the distance sensor from the gesture to be measured passing the distance sensor, and those skilled in the art should select an appropriate distinguishing method according to actual application requirements, so as to realize the distinguishing of the human body from the hand gesture to be measured as the design criteria, which will not be repeated herein.

In an optional embodiment, as shown in FIGS. 6, 7, 8, 9 and 10, the gesture recognition apparatus further includes at least one third distance sensor located in the same plane as the first distance sensor and the second distance sensor. A main axis of the third distance sensor is parallel to the main axes of the first distance sensor and the second distance sensor and is perpendicular to the plane. A distance from the third distance sensor to a connection line between the first distance sensor and the second distance sensor is a second spacing. The third distance sensor is configured to measure third distances of the gesture to be measured within a third preset distance. The controller forms a third trajectory according to the plurality of third distances measured by the third distance sensor within the first preset time, and a distant-near-distant third wave trough trajectory exists in the third trajectory in chronological order. The gesture recognition method further includes: recognizing the gesture to be measured according to the first trajectory, the second trajectory and the third trajectory as well as a position relationship between the first distance sensor, the second distance sensor and the third distance sensor.

In the present embodiment, the distances of the gesture to be measured are measured respectively by the three distance sensors TOF1, TOF2 and TOF3 that are not mounted on the same horizontal or vertical line. The controller forms three trajectories according to the distances measured by the three distance sensors correspondingly. In addition, the controller recognizing the gesture to be measured according to the three trajectories as well as the position relationship among the TOF1, the TOF2 and the TOF3 particularly relates to the following scenarios.

In the first scenario, if the first wave trough trajectory appears first and the second wave trough trajectory appears after the third wave trough trajectory, the direction of the gesture to be measured is from the first distance sensor to the second distance sensor.

In the second scenario, if the second wave trough trajectory appears first and the first wave trough trajectory appears after the third wave trough trajectory, the direction of the gesture to be measured is from the second distance sensor to the first distance sensor.

In the third scenario, if the first or second wave trough trajectory appears first and the third wave trough trajectory appears after the first and second wave trough trajectories, the direction of the gesture to be measured is from the sides of both the first distance sensor and the second distance sensor to the third distance sensor.

In the fourth scenario, if the third wave trough trajectory appears first and the first and second wave trough trajectories appears after the third wave trough trajectory, the direction of the gesture to be measured is from the third distance sensor to the sides of both the first distance sensor and the second distance sensor.

In an optional embodiment, the mounting positions of the TOF1, the TOF2 and the TOF3 may form a right triangle, an equilateral triangle, or any other type of triangles (such as a similar equilateral triangle). A specific implementation process is the same as those in the previous embodiments, and will not be repeated herein.

In the present embodiment, the controller recognizes the gesture to be measured in the four directions perpendicular to the mounting plane according to the distances of the gesture to be measured that are respectively measured by the three distance sensors TOF1, TOF2 and TOF3 whose mounting positions are not mounted on the same horizontal or vertical line, so that a structure of a gesture recognition apparatus with distance sensors in the prior art is simplified, and the cost is reduced.

It should be noted that although the above takes the example in which the distance sensors are located in the same plane and the main axes of the distance sensors are perpendicular to the plane for illustration, the implementations of the present disclosure may not be limited thereto. In an example, two, three or more distance sensors may be mounted on the same curved surface (such as a spherical surface or a cylindrical surface), and a curvature of a curve of the curved surface cut in any plane does not exceed a curvature of a hand trajectory when the hand rotates with the elbow and/or shoulder and/or wrist as the axis. In this way, although the distance sensors are mounted on the curved surface approaching to a plane, their working modes and the corresponding gesture recognition mode are basically the same as those described in the above. The controller can still distinguish different gesture according to the distance trajectories respectively detected by the distance sensors within the same time period, which will not be repeated herein.

Another embodiment of the present disclosure provides a computer-readable storage medium on which a computer program is stored. The program enables the following to be implemented when being executed by a processor: receiving, by a controller, first distances of a gesture to be measured that is measured by a first distance sensor within a first preset distance to form a first trajectory according to the plurality of first distances within a first preset time; receiving, by the controller, second distances of the gesture to be measured that is measured by a second distance sensor within a second preset distance to form a second trajectory according to the plurality of second distances within the first preset time; and recognizing the gesture to be measured by the controller according to the first trajectory and the second trajectory as well as a position relationship between the first distance sensor and the second distance sensor.

In practical applications, the computer-readable storage medium may adopt any combination of one or more computer-readable media. The computer-readable medium may be a computer-readable signal medium or a computer-readable storage medium. The computer-readable storage medium may be, for example but not limited to, an electronic, magnetic, optical, electromagnetic, infrared or semiconductor system, apparatus or device, or any combination of the foregoing. More specific (non-exhaustive lists) examples of the computer-readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any suitable combination of the foregoing. In the present embodiment, the computer-readable storage medium may be any tangible medium that contains or stores a program which may be used by an instruction execution system, apparatus or device, or used in combination therewith.

The computer-readable signal medium may include a data signal with a computer-readable program code embodied therein that is propagated in a baseband or as part of a carrier wave. The propagated data signal may be in various forms, including but not limited to, electromagnetic signals, optical signals or any suitable combination of the foregoing. The computer-readable signal medium may also be any computer-readable medium except the computer-readable storage medium. The computer-readable medium may send, propagate or transmit a program for use by or use in combination with an instruction execution system, apparatus or device.

The program code contained on the computer-readable medium may be transmitted by any appropriate medium, including but not limited to wireless, a wireline, an optical fiber cable, RF, etc., or any suitable combination of the foregoing.

The computer program code for executing the operations of the present disclosure may be written in one or more programming languages or a combination thereof, the programming languages including object-oriented programming languages such as Java, Smalltalk and C++, as well as conventional procedural programming languages such as "C" language or similar programming languages. The program code may be executed entirely or partly on the user's computer, or as an independent software package, or partly on the user's computer and partly on a remote computer, or entirely on the remote computer or server. When the remote computer is referred to, the remote computer may be connected to a user computer via any kind of network, including a local area network (LAN) or a wide area network (WAN), or may be connected to an external computer (e.g., via the Internet provided by an Internet service provider).

Figure 14:
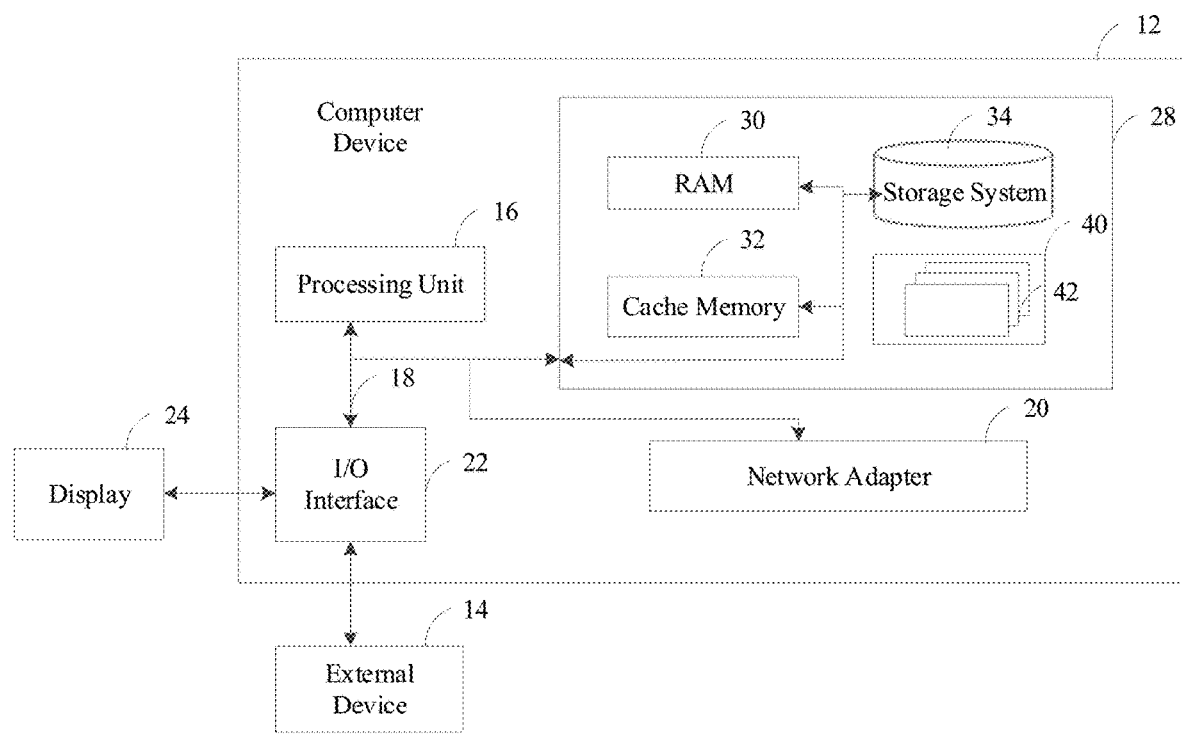
FIG. 14 is a schematic structure diagram of a computer device provided by yet still another embodiment of the present disclosure.

FIG. 14 is a schematic structure diagram of a computer device provided by another embodiment of the present disclosure. The computer device 12 shown in FIG. 14 is just an example, and should not bring any limitation to functions and a use scope of the embodiments of the present disclosure.

As shown in FIG. 14, the computer device 12 is shown in the form of a general-purpose computing device. Components of the computer device 12 may include, but are not limited to, one or more processors or processing units 16, a system memory 28 and a bus 18 connecting different system components (including the system memory 28 and the processing unit 16).

The bus 18 represents one or more of several types of bus structures, including a memory bus or memory controller, a peripheral bus, a graphics acceleration port, a processor, or a local bus using any of the bus structures. For example, these architectures include, but are not limited to, an industry standard architecture (ISA) bus, a micro channel architecture (MAC) bus, an enhanced ISA bus, a video electronics standards association (VESA) local bus, and a peripheral component interconnection (PCI) bus.

The computer device 12 typically includes a variety of computer system-readable media, each of which may be any available media that can be accessed by the computer device 12, including volatile and nonvolatile media, and removable and non-removable media.

The system memory 28 may include computer system readable media in the form of a volatile memory, such as a random access memory (RAM) 30 and/or a cache memory 32. The computer device 12 may further include other removable/non-removable, volatile/nonvolatile computer system storage media. By way of example only, the storage system 34 may be configured to read and write non-removable and non-volatile magnetic media (which are not shown in FIG. 14 and are commonly referred to as a "hard disk drive"). Although not shown in FIG. 14, a magnetic disk drive for reading and writing to a removable non-volatile magnetic disk (e.g., "floppy disk"), and an optical disk drive for reading and writing to a removable non-volatile optical disk (e.g., CD-ROM, DVD-ROM, or other optical media) may be provided. In these scenarios, each drive may be connected to the bus 18 through one or more data medium interfaces. The memory 28 may include at least one program product having a set of (e.g., at least one) program modules configured to execute functions of the various embodiments of the present disclosure.

A program/utility tool 40 having a set of (at least one) program modules 42 may be stored in, for example, the memory 28. Such program modules 42 include but are not limited to an operating system, one or more application programs, other program modules, and program data. Each of the operating system, one or more application programs, other program modules, and program data or some combination thereof, may include an implementation of a networking environment. The program module 42 generally executes the functions and/or methods in the embodiments described in the present disclosure.

The computer device 12 may also communicate with one or more external devices 14 (for example, a keyboard, a pointing device, a display 24, and the like), and may also communicate with one or more devices enabling a user to interact with the computer device 12, and/or any devices (such as a network card and a modem) enabling the computer device 12 to communicate with one or more other computing devices. Such communication may be performed through an input/output (I/O) interface 22. Moreover, the computer device 12 may also communicate with one or more networks (for example, a local area network (LAN), a wide area network (WAN) and/or a public network such as the Internet) through a network adapter 20. As shown in FIG. 14, the network adapter 20 communicates with other modules of the computer device 12 through the bus 18. It should be understood that although not shown in FIG. 14, other hardware and/or software modules may be used in conjunction with the computer device 12, and may include but not limited to a microcode, a device driver, a redundant processing unit, an external disk drive array, a RAID system, a magnetic tape drive, a data backup storage system, etc.

The processor unit 16 executes various functional applications and data processing by running programs stored in the system memory 28, for example, to implement a gesture recognition method provided by an embodiment of the present disclosure.

Aiming at the existing problems, the present disclosure provides the gesture recognition apparatus, the gesture recognition method, the computer device and the storage medium; and the gesture to be measured in two directions perpendicular to the main axes of the distance sensors can be recognized only by the two distance sensors. Thus, the existing gesture recognition apparatus based on the distance sensor is optimized, thereby solving the problems in the prior art. In particular, the gesture to be measured in four directions perpendicular to the main axes of the distance sensors can be recognized only by the three distance sensors, so that the efficiency of the distance sensor is effectively improved, and the cost of the gesture recognition apparatus is reduced. Therefore, the gesture recognition apparatus provided by the present disclosure has a wide application prospect.

Obviously, the above embodiments of the present disclosure are only for the purpose of clearly explaining the examples of the present disclosure, not for the limitation of the implementations of the present disclosure. For those of ordinary skill in the art, other changes or variations in different forms can be made on the basis of the above description. Here, it is impossible to enumerate all the implementations. Any obvious changes or variations derived from the technical solutions of the present disclosure are still within the protection scope of the present disclosure.

What is claimed is:

1. A gesture recognition apparatus, comprising a controller, a first distance sensor, a second distance sensor, and a third distance sensor, wherein a first measurement area of the first distance sensor partially overlaps a second measurement area of the second distance sensor, and the first measurement area is a spatial range measurable in distance by the first distance sensor, and the second measurement area is a spatial range measurable in distance by the second distance sensor;

the controller is connected to the first distance sensor and the second distance sensor, respectively, and the controller is configured to acquire a first trajectory and a second trajectory of a gesture to be measured, and recognize the gesture to be measured according to the first trajectory and the second trajectory as well as a position relationship between the first distance sensor and the second distance sensor; the first trajectory reflects changes over time of a plurality of first distances obtained by the first distance sensor within an occurrence period of the gesture to be measured; and the second trajectory reflects changes over time of a plurality of second distances obtained by the second distance sensor within the occurrence period of the gesture to be measured, a number of the third distance sensor in the gesture recognition apparatus is one; the first distance sensor, the second distance sensor and the third distance sensor are arranged in any one of the following ways:

a connection line between the third distance sensor and the first distance sensor is perpendicular to a connection line between the first distance sensor and the second distance sensor; and the third distance sensor, the first distance sensor and the second distance sensor are at three vertexes of an equilateral triangle or a similar equilateral triangle, respectively;

wherein in the case that the connection line between the third distance sensor and the first distance sensor is perpendicular to the connection line between the first distance sensor and the second distance sensor, the controller is further configured to execute at least one of the following steps:

in response to a judgment result that durations of both a first wave trough trajectory and a second wave trough trajectory are substantially simultaneous and a duration of a third wave trough trajectory is later than the durations of both the first wave trough trajectory and the second wave trough trajectory, obtaining that a direction of the gesture to be measured is from the first distance sensor to the third distance sensor;

in response to a judgment result that the duration of the third wave trough trajectory is earliest and the durations of both the first wave trough trajectory and the second wave trough trajectory are substantially simultaneous after the duration of the third wave trough trajectory, obtaining that the direction of the gesture to be measured is from the third distance sensor to the first distance sensor;

in response to a judgment result that the durations of both the first wave trough trajectory and the third wave trough trajectory are substantially simultaneous and the duration of the second wave trough trajectory is later than the durations of both the first wave trough trajectory and the third wave trough trajectory, obtaining that the direction of the gesture to be measured is from the first distance sensor to the second distance sensor; and in response to a judgment result that the duration of the second wave trough trajectory is earliest and the durations of both the first wave trough trajectory and the third wave trough trajectory are substantially simultaneous after the duration of the second wave trough trajectory, obtaining that the direction of the gesture to be measured is from the second distance sensor to the first distance sensor.

2. The gesture recognition apparatus of claim 1, wherein the controller is further configured to:

set both a first distance exceeding a maximum gesture recognition distance in the first trajectory and a second distance exceeding the maximum gesture recognition distance in the second trajectory as the maximum gesture recognition distance when acquiring the first trajectory and the second trajectory of the gesture to be measured.

3. The gesture recognition apparatus of claim 2, wherein the first distance sensor and the second distance sensor are in a same plane; the first measurement area is a spatial area with a main axis of the first distance sensor as a symmetry axis; the second measurement area is a spatial area with a main axis of the second distance sensor as a symmetry axis; the main axes of the first distance sensor and the second distance sensor are both perpendicular to the plane; and the controller is further configured to:

prior to acquiring the first trajectory and the second trajectory of the gesture to be measured, calculate the maximum gesture recognition distance according to a spacing between the first distance sensor and the second distance sensor, a field angle of the first distance sensor, a field angle of the second distance sensor, and a minimum movement distance that the gesture to be measured is capable of passing through an overlapping area between the first measurement area and the second measurement area in a direction from the first distance sensor to the second distance sensor.

4. The gesture recognition apparatus of claim 1, wherein the first distance sensor and the second distance sensor are in a same plane; the first measurement area is a spatial area with a main axis of the first distance sensor as a symmetry axis; the second measurement area is a spatial area with a main axis of the second distance sensor as a symmetry axis; and the main axes of the first distance sensor and the second distance sensor are both perpendicular to the plane.

5. The gesture recognition apparatus of claim 4, wherein the controller is further configured to:

judge whether a first distant-near-distant wave trough trajectory exists in the first trajectory and whether a second distant-near-distant wave trough trajectory exists in the second trajectory; and recognize the gesture to be measured according to a sequential order of the first wave trough trajectory and the second wave trough trajectory as well as the position relationship between the first distance sensor and the second distance sensor in response to a judgment result that the first wave trough trajectory and the second wave trough trajectory exist.

6. The gesture recognition apparatus of claim 5, wherein a condition for judging that the first wave trough trajectory and the second wave trough trajectory exist comprises at least one of the followings:

the durations of both the first wave trough trajectory and the second wave trough trajectory are shorter than a wave trough time threshold;

a change amplitude of each of rising and falling edges of the first wave trough trajectory and rising and falling edges of the second wave trough trajectory in a unit time is greater than a distance threshold; and both the first wave trough trajectory and the second wave trough trajectory change from distant to near to be less than the maximum gesture recognition distance, and change from near to distant to be greater than the maximum gesture recognition distance.

7. The gesture recognition apparatus of claim 5, wherein the controller is further configured to perform at least one of the following steps:

in response to a judgment result that the first wave trough trajectory is earlier than the second wave trough trajectory, obtaining that a movement direction of the gesture to be measured is from the first distance sensor to the second distance sensor; and in response to a judgment result that the second wave trough trajectory is earlier than the first wave trough trajectory, obtaining that the movement direction of the gesture to be measured is from the second distance sensor to the first distance sensor.

8. The gesture recognition apparatus of claim 1, further comprising at least one third distance sensor, wherein a third measurement area of each of the at least one third distance sensor partially overlaps the first measurement area, partially overlaps the second measurement area, and is a spatial range measurable in distance by the third distance sensor;
the controller is connected to each of the at least one third distance sensor, and the controller is configured to acquire a first trajectory, a second trajectory and a third trajectory of the gesture to be measured, and recognize the gesture to be measured according to the first trajectory, the second trajectory and the third trajectory as well as a position relationship between every two of the first distance sensor, the second distance sensor and the at least one third distance sensor; and the third trajectory reflects changes over time of a plurality of third distances obtained by the third distance sensor within the occurrence period of the gesture to be measured.

9. The gesture recognition apparatus of claim 8, wherein the first distance sensor, the second distance sensor and each of the at least one third distance sensor are all in a same plane; the first measurement area is a spatial area with a main axis of the first distance sensor as a symmetry axis; the second measurement area is a spatial area with a main axis of the second distance sensor as a symmetry axis; the third measurement area is a spatial area with a main axis of the third distance sensor as a symmetry axis; and
the main axes of the first distance sensor, the second distance sensor and the at least one third distance sensor are all perpendicular to the plane.

10. The gesture recognition apparatus of claim 8, wherein the first distance sensor, the second distance sensor and the at least one third distance sensor are coordinated with one another in any one of the following ways:
the first distance sensor, the second distance sensor and the at least one third distance sensor distance share one light source;
working frequency bands of the first distance sensor, the second distance sensor and each of the at least one third distance sensor distance are different; and
the controller controls the first distance sensor, the second distance sensor and the at least one third distance sensor distance to measure distances in turn within a measurement cycle.

11. A gesture recognition method using the gesture recognition apparatus of claim 1, the gesture recognition method comprising:
receiving, by a controller, a plurality of first distances obtained by a first distance sensor within an occurrence period of a gesture to be measured to obtain a first trajectory according to a relationship of the plurality of first distances over time;
receiving, by the controller, a plurality of second distances obtained by a second distance sensor within the occurrence period of the gesture to be measured to obtain a second trajectory according to a relationship of the plurality of second distances over time;
recognizing the gesture to be measured by the controller according to the first trajectory and the second trajectory as well as a position relationship between the first distance sensor and the second distance sensor; and
a connection line between a third distance sensor and the first distance sensor being perpendicular to a connection line between the first distance sensor and the second distance sensor, the gesture recognition method further comprising at least one of the following steps:

in response to a judgment result that durations of both a first wave trough trajectory and a second wave trough trajectory are substantially simultaneous and a duration of a third wave trough trajectory is later than the durations of both the first wave trough trajectory and the second wave trough trajectory, obtaining, by the controller, that a direction of the gesture to be measured is from the first distance sensor to the third distance sensor;

in response to a judgment result that the duration of the third wave trough trajectory is earliest and the durations of both the first wave trough trajectory and the second wave trough trajectory are substantially simultaneous after the duration of the third wave trough trajectory, obtaining, by the controller, that the direction of the gesture to be measured is from the third distance sensor to the first distance sensor;

in response to a judgment result that the durations of both the first wave trough trajectory and the third wave trough trajectory are substantially simultaneous and the duration of the second wave trough trajectory is later than the durations of both the first wave trough trajectory and the third wave trough trajectory, obtaining, by the controller, that the direction of the gesture to be measured is from the first distance sensor to the second distance sensor; and in response to a judgment result that the duration of the second wave trough trajectory is earliest and the durations of both the first wave trough trajectory and the third wave trough trajectory are substantially simultaneous after the duration of the second wave trough trajectory, obtaining, by the controller, that the direction of the gesture to be measured is from the second distance sensor to the first distance sensor.

12. A non-transitory computer-readable storage medium, wherein a computer program executable by a processor is stored in the non-transitory computer-readable storage medium, and the method of claim 11 is implemented when the program is executed by the processor.

13. A computer device, comprising a memory, a processor, and a computer program stored on the memory and runnable in a processor, wherein a gesture recognition method is implemented when the processor executes the program; and the method comprises:
receiving a plurality of first distances obtained by a first distance sensor within an occurrence period of a gesture to be measured to obtain a first trajectory according to a relationship of the plurality of first distances over time, the first trajectory reflecting changes over time of the plurality of first distances;
receiving a plurality of second distances obtained by a second distance sensor within the occurrence period of the gesture to be measured to obtain a second trajectory according to a relationship of the plurality of second distances over time, the second trajectory reflecting changes over time of the plurality of second distances;
recognizing the gesture to be measured by the controller according to the first trajectory and the second trajectory as well as a position relationship between the first distance sensor and the second distance sensor, wherein
a first measurement area of the first distance sensor partially overlaps a second measurement area of the second distance sensor, and is a spatial range measurable in distance by the first distance sensor; and the second measurement area is a spatial range measurable in distance by the second distance sensor; and a connection line between a third distance sensor and the first distance sensor being perpendicular to a connection line between the first distance sensor and the second distance sensor, the method further comprises further comprising at least one of the following steps:

in response to a judgment result that durations of both a first wave trough trajectory and a second wave trough trajectory are substantially simultaneous and a duration of a third wave trough trajectory is later than the durations of both the first wave trough trajectory and the second wave trough trajectory, obtaining that a direction of the gesture to be measured is from the first distance sensor to the third distance sensor;

in response to a judgment result that the duration of the third wave trough trajectory is earliest and the durations of both the first wave trough trajectory and the second wave trough trajectory are substantially simultaneous after the duration of the third wave trough trajectory, obtaining that the direction of the gesture to be measured is from the third distance sensor to the first distance sensor;

in response to a judgment result that the durations of both the first wave trough trajectory and the third wave trough trajectory are substantially simultaneous and the duration of the second wave trough trajectory is later than the durations of both the first wave trough trajectory and the third wave trough trajectory, obtaining that the direction of the gesture to be measured is from the first distance sensor to the second distance sensor; and in response to a judgment result that the duration of the second wave trough trajectory is earliest and the durations of both the first wave trough trajectory and the third wave trough trajectory are substantially simultaneous after the duration of the second wave trough trajectory, obtaining that the direction of the gesture to be measured is from the second distance sensor to the first distance sensor.

14. The computer device of claim 13, wherein the first distance sensor and the second distance sensor are located in a same plane, the first measurement area is a spatial area with a main axis of the first distance sensor as a symmetry axis, the second measurement area is a spatial area with a main axis of the second distance sensor as a symmetry axis, and the main axes of the first distance sensor and the second distance sensor are both perpendicular to the plane; and the method further comprises:

judging whether a first distant-near-distant wave trough trajectory exists in the first trajectory and whether a second distant-near-distant wave trough trajectory exists in the second trajectory; and recognizing the gesture to be measured according to a sequential order of the first wave trough trajectory and the second wave trough trajectory as well as the position relationship between the first distance sensor and the second distance sensor in response to a judgment result that the first wave trough trajectory and the second wave trough trajectory exist.

15. The computer device of claim 14, wherein a condition for judging that the first wave trough trajectory and the second wave trough trajectory exist comprises at least one of the followings:

the durations of both the first wave trough trajectory and the second wave trough trajectory are shorter than a wave trough time threshold;

a change amplitude of each of rising and falling edges of the first wave trough trajectory and rising and falling edges of the second wave trough trajectory in a unit time is greater than a distance threshold; and both the first wave trough trajectory and the second wave trough trajectory change from distant to near to be less than the maximum gesture recognition distance, and change from near to distant to be greater than the maximum gesture recognition distance.

16. The computer device of claim 13, wherein the method further comprises:

acquiring a first trajectory, a second trajectory and a third trajectory of the gesture to be measured, and recognizing the gesture to be measured according to the first trajectory, the second trajectory and the third trajectory as well as a position relationship between every two of the first distance sensor, the second distance sensor and at least one third distance sensor, wherein a third measurement area of each of the at least one third distance sensor partially overlaps the first measurement area, partially overlaps the second measurement area, and is a spatial range measurable in distance by the third distance sensor; and the third trajectory reflects changes over time of a plurality of third distances obtained by the third distance sensor within the occurrence period of the gesture to be measured.

* * * * *